US011940198B2

(12) United States Patent
Walet et al.

(10) Patent No.: US 11,940,198 B2
(45) Date of Patent: Mar. 26, 2024

(54) AUTOMATED BLAST CELL LOADING AND UNLOADING

(71) Applicant: Lineage Logistics, LLC, Irvine, CA (US)

(72) Inventors: Daniel Walet, Irvine, CA (US); Alexander Ming Zhang, San Diego, CA (US); Claire O'Connor, Olathe, KS (US); Ben Philipsen, Olathe, KS (US)

(73) Assignee: Lineage Logistics, LLC, Irvine, CA (US)

(*) Notice: Subject to any disclaimer, the term of this patent is extended or adjusted under 35 U.S.C. 154(b) by 0 days.

(21) Appl. No.: 17/540,202

(22) Filed: Dec. 1, 2021

(65) Prior Publication Data

US 2023/0168022 A1 Jun. 1, 2023

(51) Int. Cl.

| | |
|---|---|
| ***F25D 17/06*** | (2006.01) |
| ***F25D 17/04*** | (2006.01) |
| ***F25D 23/02*** | (2006.01) |
| ***F25D 25/04*** | (2006.01) |
| *B66C 19/00* | (2006.01) |

(52) U.S. Cl.

CPC ........... *F25D 17/06* (2013.01); *F25D 17/045* (2013.01); *F25D 23/02* (2013.01); *F25D 25/04* (2013.01); *B66C 19/00* (2013.01); *F25D 2317/063* (2013.01)

(58) Field of Classification Search

CPC ........ F25D 17/06; F25D 17/045; F25D 23/02; F25D 25/04; F25D 2317/063; B66C 19/00

See application file for complete search history.

(56) References Cited

U.S. PATENT DOCUMENTS

| | | | | |
|---|---|---|---|---|
| 4,669,278 A * | 6/1987 | Lee, Jr. | ................. | F25D 13/067 62/266 |
| 5,452,588 A * | 9/1995 | Onodera | ............... | F25D 13/067 62/380 |
| 5,520,006 A * | 5/1996 | Middleton | ............ | F25D 13/067 62/278 |

(Continued)

FOREIGN PATENT DOCUMENTS

| | | |
|---|---|---|
| CN | 101284490 | 10/2008 |
| CN | 103747709 | 4/2014 |

(Continued)

OTHER PUBLICATIONS

Trippmann Group, https://www.tippmanngroup.com/qfr-zone/, QFR Zone brochure, 2009.

(Continued)

*Primary Examiner* — Filip Zec

(74) *Attorney, Agent, or Firm* — Barnes & Thornburg LLP

(57) ABSTRACT

A system for blast-freezing items includes a plurality of cells arranged side-by-side, each cell including a housing with a bay space, a plenum, a front air passage, a rear air passage, and a fan. The fan is positioned in the plenum and configured to circulate air through the bay space. Each cell also includes a plurality of channels to separate pathways of air to segments of the bay space. The system also includes a plurality of crane rails extending between rows of cells and at least one crane capable of traveling along the plurality of crane rails to load or unload each of the plurality of cells.

45 Claims, 14 Drawing Sheets

(56) References Cited

U.S. PATENT DOCUMENTS

| | | | | |
|---|---|---|---|---|
| 5,791,150 | A | 8/1998 | Bosher et al. | |
| 5,826,432 | A | 10/1998 | Ledbetter | |
| 6,128,911 | A | 10/2000 | Mathews | |
| 6,422,031 | B1 * | 7/2002 | Mandel | F25D 17/062 62/417 |
| 6,796,142 | B2 * | 9/2004 | Burn | F25D 25/04 62/380 |
| 7,315,448 | B1 * | 1/2008 | Bash | H05K 7/2079 165/80.3 |
| 8,056,349 | B2 * | 11/2011 | Oswald | F25D 11/003 62/89 |
| 8,910,491 | B2 * | 12/2014 | Iovanel | F25B 49/00 62/413 |
| 9,247,659 | B1 * | 1/2016 | Phillips | H05K 7/20827 |
| 9,861,213 | B2 * | 1/2018 | Goch | A47F 3/0447 |
| 9,943,011 | B2 * | 4/2018 | Shrivastava | H05K 7/20709 |
| 9,970,670 | B2 * | 5/2018 | Carlson | H05K 7/20745 |
| 10,172,261 | B2 * | 1/2019 | Wilcox | H05K 7/1491 |
| 10,375,864 | B2 * | 8/2019 | Dawson | H05K 7/20736 |
| 10,375,978 | B2 * | 8/2019 | Woolf | A23L 3/001 |
| 10,378,784 | B2 * | 8/2019 | Germagian | G05B 19/048 |
| 10,474,982 | B2 * | 11/2019 | Winkle | B65D 81/18 |
| 10,660,328 | B2 * | 5/2020 | Moon | F25D 29/006 |
| 10,663,210 | B1 | 5/2020 | Zhang | |
| 10,935,299 | B2 * | 3/2021 | Davis | F25D 3/04 |
| 11,076,509 | B2 * | 7/2021 | Alissa | H05K 7/20836 |
| 11,243,019 | B2 | 2/2022 | Zhang | |
| 11,320,189 | B1 * | 5/2022 | Tippmann | F25D 17/06 |
| 2004/0109288 | A1 * | 6/2004 | Beitelmal | H05K 7/20836 361/679.53 |
| 2004/0194494 | A1 | 10/2004 | Wilkinson | |
| 2010/0119672 | A1 * | 5/2010 | Crane | A23B 7/0433 426/419 |
| 2011/0107784 | A1 | 5/2011 | Tippmann | |
| 2011/0174001 | A1 * | 7/2011 | Carlson | H05K 7/20727 62/96 |
| 2011/0307102 | A1 * | 12/2011 | Czamara | H05K 7/20836 700/282 |
| 2012/0167600 | A1 * | 7/2012 | Dunnavant | H05K 7/20836 62/89 |
| 2015/0250225 | A1 | 9/2015 | Hata | |
| 2017/0086485 | A1 | 3/2017 | Tippmann | |
| 2018/0320949 | A1 | 11/2018 | Lippmann | |
| 2019/0045817 | A1 | 2/2019 | Woolf et al. | |
| 2020/0408456 | A1 | 12/2020 | Zhang | |
| 2022/0154996 | A1 * | 5/2022 | Zhang | F25D 17/067 |

FOREIGN PATENT DOCUMENTS

| | | |
|---|---|---|
| CN | 105698465 | 6/2016 |
| DE | 202009015795 | 2/2010 |
| KR | 20030021876 | 3/2003 |
| WO | WO 2016199487 | 12/2016 |

OTHER PUBLICATIONS

International Search Report and Written Opinion in PCT/US2022/051378, dated Apr. 28, 2023, 19 pages.

International Search Report and Written Opinion in international application serial No. PCT/US2022/051378, 15 pgs.

* cited by examiner

AUTOMATED BLAST CELL LOADING AND UNLOADING

TECHNICAL FIELD

This specification generally relates to technology for efficiently cooling physical items in a blast cell system.

BACKGROUND

Convective air blast freezing is a process by which freezing of items like foodstuffs is facilitated by flowing very cold air over the items via mechanical force. Such air blast freezing can be typically used for very large volumes of goods that are carried on pallets. Airflow of thousands of cubic feet per minute (CFM) can be used for freezing. Blast freezing is typically used on perishable foods (e.g., fruits and meats) geographically near their point of initial food processing. Such goods may then be stored for a short or long period in frozen warehouse, and then shipped to a point close to their use, such as to a grocery store or a warehouse operated by a particular grocer.

Such food decays largely because it includes water, which when not frozen, is a hospitable environment for bacteria and other pathogens. Blast freezing can prevent this process and thus is employed broadly in the food distribution industry. Blast freezing can be a large and expensive consumer of electricity, natural gas, or other mechanisms needed to operate chillers, fans, and other equipment required to perform such large-scale cooling.

SUMMARY

This document generally describes technology for providing improved blast cells and systems for cooling of items, such as perishable foodstuffs. Blast cells are enclosures designed to hold and cool a group of pallets through the use of one or more fans that circulate air within the enclosure and a cooling system (e.g., cooling coils, such as evaporators) that effectively transfers heat picked up from the pallets out of the enclosure. Blast cells are often run for extended periods of time (e.g., 24-48 hours) to ensure that each pallet within the cell is able to reach a target temperature. Although many portions of warehouses, including cold storage warehouses, have been automated, blast cells are an area that has been challenging to automate because the temperatures within blast cells can be well below freezing for extended periods of time, which can cause ice buildup and can hinder the operation of automated components (e.g., conveyors, autonomous guided vehicle (AGV)). As a result, blast cells have been manually loaded by operators using forklifts, which can increase the required footprint within a warehouse for blast cells so that forklifts can adequately maneuver pallets in and out of the blast cells and can avoid cross-traffic to other blast cells by other forklifts. The innovation disclosed in this document can provide solutions to one or more of these and/or other issues with blast cells. For example, the disclosed innovation can provide blast cells that are capable of reliable automated loading and unloading of pallets, that can reduce the required footprint within a warehouse for the blast cells, that can increase the throughput of pallets for blast freezing, and/or that can reduce the blast freezing cycle time for pallets in blast cells.

A variety of blast cell configurations and arrangements are described throughout this document, including blast cells with side loading doors permitting reliable loading/unloading of pallets by automated pallet movers (e.g., cranes), blast cells with air flow guides (e.g., vanes) on one or both sides of the flow path to evenly divide the volume of circulating air across each row of pallets, arrangements of multiple blast cells and pallet movers to permit for efficient use of automation resources and redundancy, and/or control algorithms to maximize the throughput of pallets through the blast cells. For example, a blast cell system of the present disclosure can provide simple and easily scalable designs that prevent short cycling of air flow through any pallets in different levels (e.g., rows) in blast cells. The blast cell system can reduce turbulence in air circulation in the blast cells. In some examples, each of the different levels, rows, or layers in a blast cell are provided with one or more separate channels configured to direct the flow of air that is pulled from the respective levels to a fan in the blast cell and to direct the flow of air discharged from the fan to the levels. The channels can be designed to provide independent fluid pathways that are in fluid communication with different levels in a bay space of a blast cell, such that air flow that has passed through the respective levels is partitioned and pulled through the independent channels to a fan that operates to draw air from the bay space in the blast cell, and to discharge the air to be cooled. The channels can form closed-loop circulation of air through different levels in the bay space of the blast cell and provide a vacuum cleaner effect in air circulation in the blast cell.

Some examples of the blast cell of the present disclosure can include one or more air flow guides to reduce turbulent air and enhance flow in air circulation in the blast cell. The air flow guides include streamlined structures. In some examples, the air flow guides can include turning vanes that are arranged at sharp edges or corners of the blast cell to reduce turbulence thereat and provide efficient air flow. For example, the turning vanes can be arranged at a corner adjacent a cell entry and to be in fluid communication with a plenum that passes the air pushed from the fan. The turning vanes are configured to be curved so that the air passing through the turning vanes are streamlined.

Automation of a blast cell system can involve automating the process of blast freezing and the loading and unloading of blast cells using automation equipment with appropriate controls logic. In particular, the coordination of the control and movements of multiple blast cells in a row is required for efficient use of resources including blast cells, autonomous loading and unloading vehicles and robots, storage space, and power. Blast cells are traditionally loaded and unloaded manually via forklifts, with planning and coordination being managed by an operations team. Automating the process can instead create an all-in-one solution where the automation system coordinates and enacts the pallet movements and blast cycles together.

Where the system is automatically controlled by machines and/or robots instead of people and forklifts, the blast process can be conducted more safely and efficiently. For example, without the use of autonomous machines, cross flow traffic of simultaneously unloading and loading blast cells in traditional, manual blast operations, is almost impossible unless a huge amount of space and separation of the tasks can be achieved. With an autonomous control system, not only is safety improved (and the risk substantially eliminated with regard to people loading and unloading) but also efficiency and throughput is increased because loading and unloading can be performed in the same area and at the same time.

In a system of blast cells in which multiple blast cells are lined up side-by-side forming an array of rows and columns, autonomous cranes can move between the columns and/or rows of blast cells to access the blast cell doors for loading and unloading of pallets of items. The autonomous cranes can move on rails or tracks that allow movement along a row and vertical movement to access all pallet positions within the blast cell. In some implementations, the cranes are aisle switching cranes. The blast cells include a door on either side of the cell, enabling loading and unloading of the blast cells from the side rather than from the front as would be conventional in a manual operated warehouse. After loading the blast cells from the side, a large door is required to close the blast cell, such that the cold air remains in the blast cell and freezes the pallets quickly. Upon blast freezing completion the door may be opened and the cranes may unload the pallets from the blast cell.

In an aspect, an apparatus for cooling items includes a housing, a fan, a first plurality of channels and a second plurality of channels. The housing includes a bay space, a plenum positioned above the bay space, a front air passage fluidly connecting a front end of the bay space to a front end of the plenum and a rear air passage fluidly connecting a rear end of the bay space to a rear end of the plenum. The bay space, the plenum, the front air passage, and the rear air passage collectively provide a closed-loop within which air is circulated within the housing. The bay space includes a plurality of layers that are each configured to hold one or more rows of pallets of items to be cooled. The fan is positioned within the plenum and configured to circulate air through the closed-loop provided by the bay space in the housing. The fan is operable to pull the air from the rear of end of the bay space, through the rear air passage and into the rear end of the plenum, and to discharge the air into the front end of the plenum, through the front air passage, and toward the front end of the bay space. The first plurality of channels are arranged within the rear air passage. Each of the first plurality of channels defines a first fluid pathway that is fluidly separate from other fluid pathways provided by others of the first plurality of channels. Each of the first plurality of channels extends from a rear end of the corresponding layer of the plurality of layers to the rear end of the plenum. The first plurality of channels are configured to, over their length, turn a direction of airflow from the rear end of the bay space to the rear end of the plenum. The second plurality of channels are arranged within the front air passage, each of the second plurality of channels defining a second fluid pathway.

In another aspect, a system for cooling items includes a plurality of cells arranged side-by-side. Each of the plurality of cells includes a housing, a fan, and a first plurality of channels. The housing includes a bay space, a plenum positioned above the bay space, a front air passage fluidly connecting a front end of the bay space to a front end of the plenum and a rear air passage fluidly connecting a rear end of the bay space to a rear end of the plenum. The bay space, the plenum, the front air passage, and the rear air passage collectively provide a closed-loop within which air is circulated within the housing. The bay space includes a plurality of layers that are each configured to hold one or more rows of pallets of items to be cooled. The fan is positioned within the plenum and configured to circulate air through the closed-loop provided by the bay space in the housing. The fan is operable to pull the air from the rear of end of the bay space, through the rear air passage and into the rear end of the plenum, and to discharge the air into the front end of the plenum, through the front air passage, and toward the front end of the bay space. The first plurality of channels are arranged within the rear air passage. Each of the first plurality of channels defines a first fluid pathway that is fluidly separate from other fluid pathways provided by others of the first plurality of channels. Each of the first plurality of channels extends from a rear end of the corresponding layer of the plurality of layers to the rear end of the plenum. The first plurality of channels are configured to, over their length, turn a direction of airflow from the rear end of the bay space to the rear end of the plenum. In some implementations, the housing further includes a second plurality of channels.

In an aspect, a method for scheduling loading and unloading a cooling system includes providing an array of blasé cells in a blast freezing system, where the array of blast cells include m rows of blast cells with an outer row at each end. The blast freezing system includes a plurality of rails with a rail positioned between each row of blast cells and at an outside edge of the outer rows. The blast freezing system further includes a plurality of automated cranes, each crane of the plurality of automated cranes operable to move along a dedicated rail of the plurality of rails to access blast cells along the rail through at least one door of the blast cells opening to the rail. The method further includes determining a start time of a freezing cycle for each of the blast cells in the array, and determining an estimated end time of the freezing cycle for each of the blast cells in the array based on the determined start time. The method includes scheduling at least one automated crane to unload each of the blast cells based on the estimated end time of the freezing cycle. The method includes generating first instructions for transmission to at least one automated crane, the first instructions comprising at least one of a location of a blast cell along the dedicated rail associated with the at least one automated crane and a time and transmitting the first instructions to the at least one automated crane.

The details of one or more implementations are set forth in the accompanying drawings and the description below. Other features and advantages will be apparent from the description and drawings, and from the claims.

DETAILED DESCRIPTION OF ILLUSTRATIVE EMBODIMENTS

Described below are various implementations of methods and systems for cooling (e.g., blast freezing) items such as perishable foodstuffs that have previously been packed as groups of items onto shipping and storage pallets. The systems and techniques discussed herein provide simple and easily scalable blast cells that prevent short cycling of air flow through the items in blast cells. Each blast cell can include a plurality of channels that provide independent fluid pathways for directing the air drawn from different rows in the blast cell into the fan, as well as other air-directing features. Multiple blast cells can be arranged in an array, and cranes or other autonomous machines or vehicles can be controlled to load and unload the blast cells to optimize efficiency, while improving safety and consistency of the system.

Figure 1:
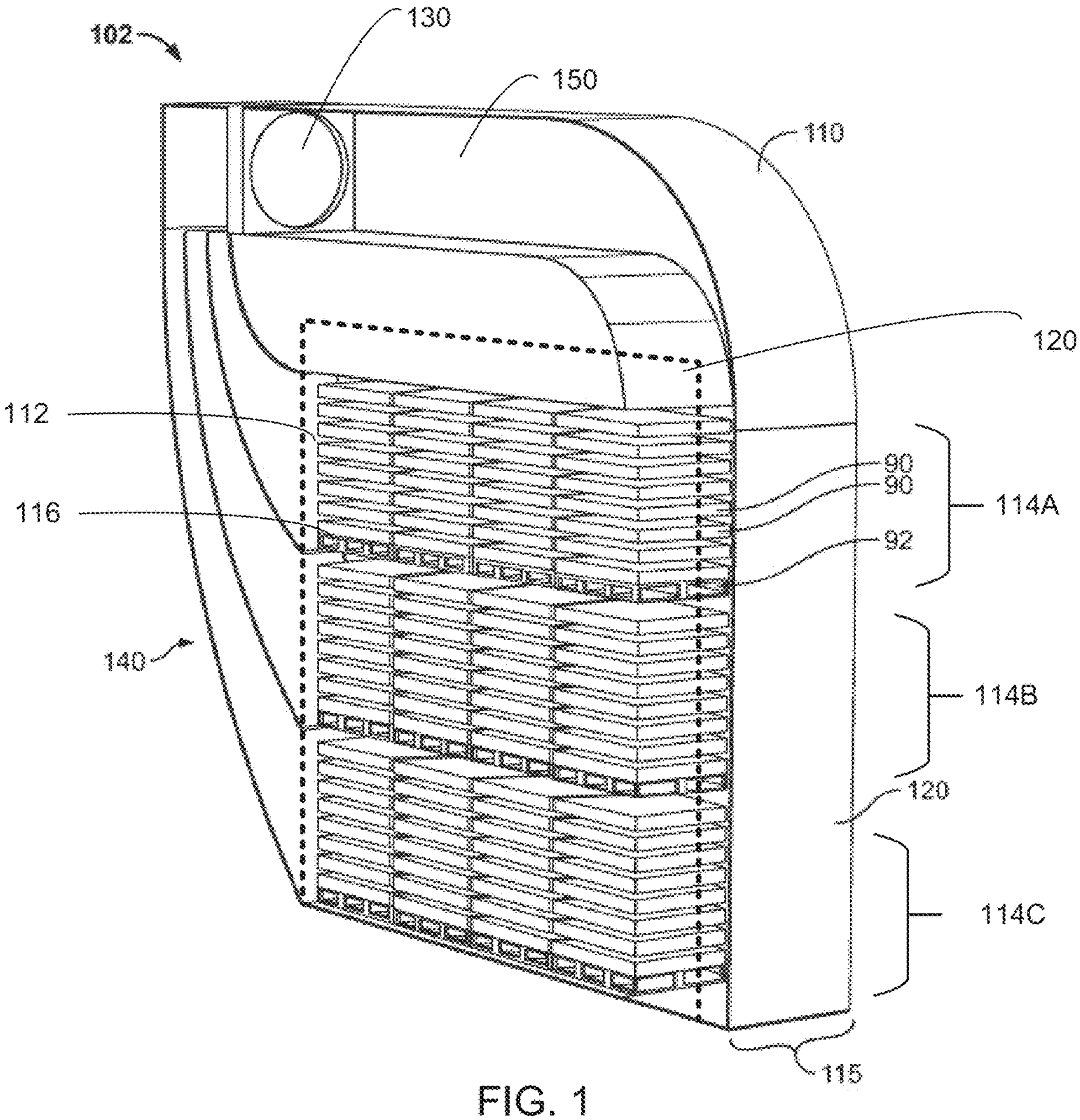
FIG. 1 shows a cross-sectional perspective view of an example blast cell having rearward channels with pallets loaded.

FIG. 1 shows a cross-sectional perspective view of an example blast cell 102 having rearward channels with pallets loaded. The blast cell 102 can include a housing 110, a door 120, a fan 130, an air suction channel assembly 140, and an intake plenum 150.

The housing 110 defines a bay space 112 in which items 90 are loaded for cooling. In some embodiments, the items 90 can be stacked on pallets 92, and the pallets 92 are carried and held in the bay space 112 so that the items 90 can be cooled in the blast cell 102. The items 90, such as boxes or packages, can be stacked in multiple rows on each pallet 92, and the items 90 in adjacent rows can be spaced apart by a separator to provide a room to allow air flow between the adjacent rows of items. In some embodiments, as illustrated in FIG. 1, the housing 110 of the blast cell 102 is configured to provide a plurality of levels 114A-C in the bay space 112. In the illustrated example, the plurality of levels 114A-C are arranged to form different rows in the bay space 112. In other embodiments, the plurality of levels 114A-C can be arranged in different orientations to form, for example, different columns or different sections defined by multiple rows and columns. In some implementations, the blast cell 102 can include any number of levels and rows of items, for example, the blast cell 102 can include 2 levels, 3 levels, 4 levels, 5 levels, or more.

In the illustrated example, the housing 110 includes three levels (e.g. rows) 114A, 114B, and 114C (collectively 114). Each level 114 is configured to hold the items 90 thereon. The blast cell 102 can provide one or more structures 116 that separate the levels 114 and hold the items 90 on the respective levels 114. For example, the structures 116 can include one or more shelves on which the items 90 and/or pallets 92 are placed. Other configurations of the structures 116 are also possible, such as flanges extending from at least one of the opposite side walls of the blast cell 102. The structures 116 enable the pallets 92 to be easily placed and removed into the blast cell 102.

In some embodiments, the blast cell 102 is configured to open for loading of items into the bay space 112. For example, the blast cell 102 includes a door 120 that is arranged on a side of the housing 110 to allow for side-loading and unloading of the bay space 112. The door 120 is configured to at least partially open the side of the housing 110 to provide an entrance to the bay space 112 for loading and unloading items 90 and/or pallets 92. In some embodiments, the blast cell 102 includes a second door (not shown) on an opposite side of the housing 110. The door 120 can be of various types. For example, the door 120 can be configured to swing out, swing up, roll up, slide up, or slide to the side to open up the entrance 124. In some implementations each door 120 may consist of two doors which open in opposite directions. In some implementations, the door 120 is supported from vertical structures or guides formed on the inside or outside of the housing 110. In some implementations, a secondary support for the door 120 may be coupled to the structures 116 within the housing 110. In some embodiments, the door 120 is supported from a vertical structure on an exterior of the housing 110, the vertical structure guiding the door 120, and the door 120 is also supported from a secondary support braced to a rack structure within the bay space 112 of the blast cell 102. When the door 120 is closed, the door 120 encloses the bay space 112 for cooling the items 90 loaded herein.

Conventionally, blast cells in a warehouse are loaded from the front, with a door located on the front side of the warehouse. By loading the blast cells from doors 120 in the side of the housing 110, additional airflow guidance can be implemented in the front and back sections of the blast cell 102 to improve efficiency of cooling compared to conventional blast cells. For example, the blast cell 102 includes channels 140 forming a curved rear section of the blast cell, and a curved forward corner for further directing the airflow within the blast cell 102.

Figure 2:
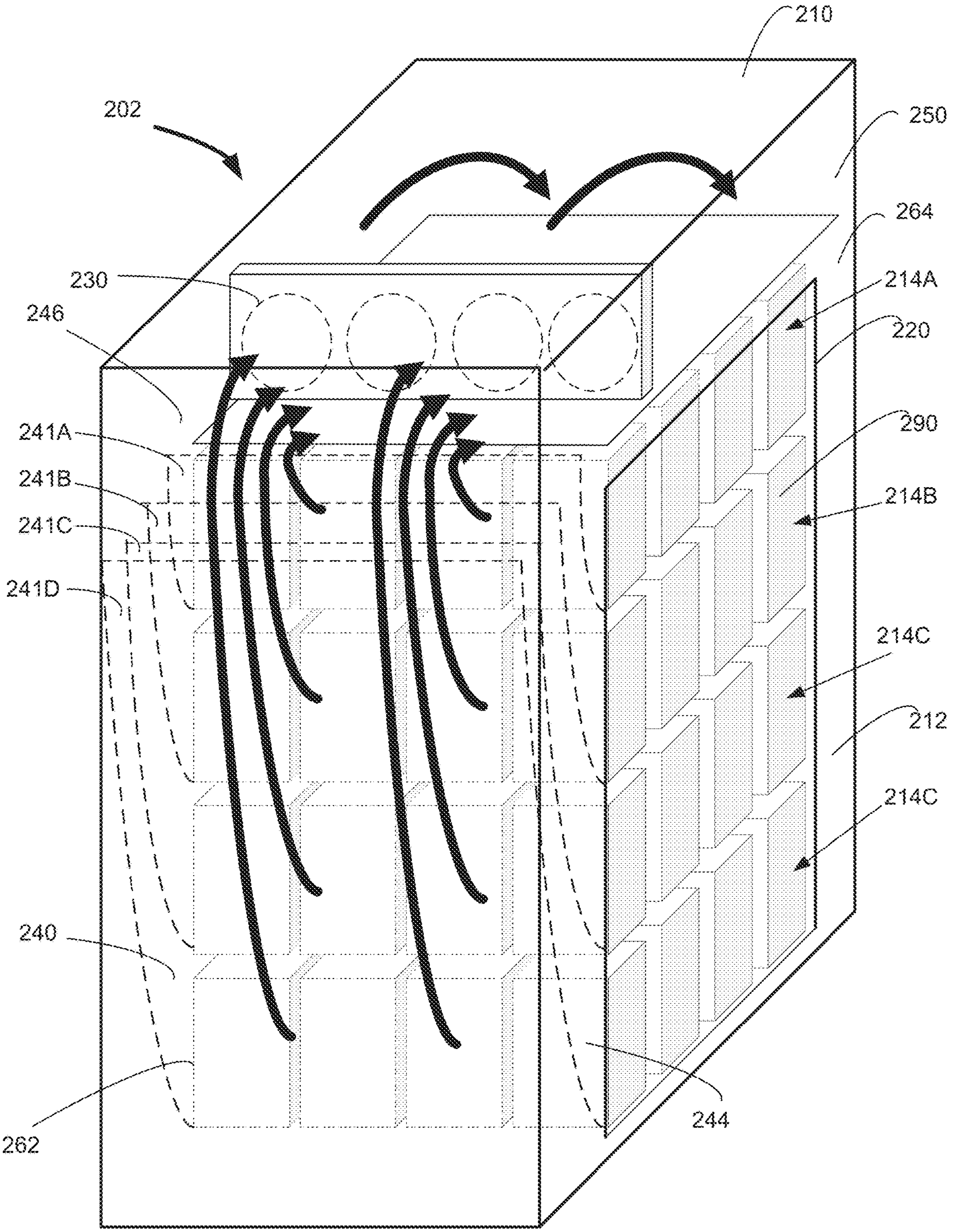
FIG. 2 shows a perspective view of airflow through an example blast cell having rearward channels.

FIG. 2 shows a perspective view of airflow through an example blast cell 202 having rearward channels 241A-D making up a rear suction channel assembly 240. Blast cell 202 includes a housing 210, a door 220 formed in a side of the housing, a fan 230, an air suction channel assembly 240 made up of four channels 241A-D, and an intake plenum 250. The housing 210 defines a bay space 212 in which items 290 are loaded for cooling. The bay space 212 includes a forward region 264 and a rearward region 262. The housing 210 of blast cell 202 includes multiple levels 214A-D, each holding items 290 in rows and columns within each level 214A-D.

The blast cell 202 includes the fan 230 configured to circulate air through the bay space 212. The arrows in FIG. 2 illustrate an example airflow through the bay space 212. In some embodiments, the fan 230 can operate to pull the air from a rearward region 262 of the bay space 212. The fan 230 can further operate to discharge the air toward a forward region 264 of the bay space 212 opposite to the rearward region 262.

The blast cell 202 includes the suction channel assembly 240 that has a plurality of channels 241A-D (collectively 241). The channels 241 are arranged between the rearward region 262 of the bay space 212 and the fan 230. Each of the channels 241 defines a fluid pathway from a level 214 in the bay space 212 toward the fan 230. The channel 241 is configured to direct air flow from the rearward region 262 of the bay space 212 toward the fan 230 through the fluid pathway defined by walls of the channel 241.

In some embodiments, a plurality of channels 241 are provided for respective levels 214 in the bay space 212. In other embodiments, the blast cell 202 includes more or less channels 241 than the number of levels 214 in the bay space 212. In yet other embodiments, the blast cell 202 can include a single channel 241 where the blast cell 202 has a single level 214 in the bay space 212. In yet other embodiments, the blast cell 202 can include a single channel 241 for a plurality of levels 214 in the bay space 212.

The suction channel assembly 240 extends between a drawing end 244 and a discharging end 246. The drawing end 244 is open at the rearward region 262 of the bay space 212 and in fluid communication with the bay space 212. The discharging end 246 is open at the rearward end of the intake plenum 250 and in fluid communication with the intake plenum 250 (e.g., the air inlet portion thereof). The suction channel assembly 240 guides the airflow through the bay space 212, preventing turbulent air patterns as the air moves through the system. The channels 241 of the suction channel assembly 240 force the fan 230 to draw in an equal volume of air through each level 214 of the bay space 212. By drawing in an equal volume of air through each channel 241, short cycling of the system is reduced and cooling is more consistent across the levels 214 relative to conventional blast cells 202.

In some embodiments, the fan 230 is arranged away from the bay space 212. The fan 230 is arranged to be spaced apart from the bay space 212 and not abutted with the part (e.g., a boundary wall) of the housing that defines the bay space 212. For example, the fan 230 can be arranged adjacent or within the intake plenum 250 that is positioned at an upper side of the housing 210. In some embodiments, the fan 230 is a plurality of fans, which can be arrayed horizontally adjacent to each other across the top rear corner of the blast cell 202, as illustrated in FIG. 2. The fans 230 can be independently operated to meet different needs in different blast cells 202. For example, particular ones of the fans 230 can be turned on or off to control air circulation in the blast cell 202, or particular ones of the fans 230 can be turned off when no air circulation is needed in particular blast cells 202.

The fan 230 can be connected to a fan controller (not shown) which controls the operation of the fan 130. In some embodiments, the fan controller includes a variable-frequency drive that varies the fan speeds as the need for different volumes of air circulation changes. Other drive systems can be used in the fan controller in other embodiments.

Cooling coils (e.g., evaporators) (not shown) can be placed in the blast cell 202 or adjacent to it. For example, the cooling coils can be placed against the upstream or downstream faces of the fan 230, or can be placed in the intake plenum 250 or another plenum or area where the air circulates so as to receive warmed air and provide cooled air. In other embodiments, the cooling coils can be placed out of the main air circulation for the blast cell 202, such as on the roof of a building, and a single bank of cooling coils can serve multiple blast cells. In such an instance, a pair of taps can be made into the intake plenum 250 or another part of the air circulation of the blast cell 202, where one tap can draw air out of the blast cell 202, and the other can return the cooled air into the blast cell 202, so that it can blend in with the main airflow of the blast cell 202.

While FIG. 2 shows a suction channel assembly 240 including channels at a rearward 262 end of the bay space 212, in some implementations, such as those illustrated in FIGS. 3A-E, channels can be included at the forward region 264 and rearward region 262 of the bay space 212. FIG. 2 shows the top rear and top front corners of the blast cell as square corners, but in some implementations, additional air flow guides can be implemented in the front and/or rear top and bottom corners to guide airflow and prevent turbulence in the corners of the blast cell 212.

FIGS. 3A-3E illustrate example blast cells 302 having different air flow guide configurations made up of channels, guide vanes, and spacing structures. In FIGS. 3A-3E, the fan 330 is located at the rear-top of the housing 310 of the blast cell 302. In other implementations, the fan 330 can be located in other positions, such as at the bottom of the blast cell 302 or at one or both sides of the blast cell 302. In other embodiments, each blast cell 302 can include multiple fans, such as one at the top of the blast cell 302 and one at the bottom thereof. The fan 330 can take a variety of appropriate forms, including propeller fans, axial fans, and centrifugal fans. The fan 330 can be sized to provide the required volume of air across expected pressure drops for the overall circulation through the blast cell 302 when it is loaded partially and fully. Channels on the forward and rearward ends of the blast cell 302 can guide the air flow through the bay space 312 to ensure equal cooling of all layers 314. Each blast cell 302 of FIGS. 3A-3E includes at least one door 320, and in particular two doors formed in opposite sides of the housing 310, so that loading and unloading of the bay space 312 is transverse to the intended direction of the airflow through the bay space 312. The various air flow guide configurations encourage even chilling throughout every layer of the bay space 312, so that each layer is fully chilled in a similar amount of time.

FIGS. 3A-3E show a side cross-sectional view of an example blast cell 302 having forward channels 345 and rearward channels 341. The plurality of rearward channels 341 of the suction channel assembly 340 can be formed by providing one or more channel walls in the suction channel assembly 340 to form separate rearward channels 341A-D. The suction channel assembly 340 is configured to be curved from the drawing end 344 and the discharging end 346 to provide streamlined air flow from the drawing end 344 to the discharging end 346.

The plurality of forward channels 345 of the forward channel assembly 345 can be formed by providing one or more channel walls in the forward channel assembly 345 to form separate forward channels 343A-D. The forward channel assembly 345 is configured to be curved from the drawing end 347 and the discharging end 349 to provide streamlined air flow from the drawing end 347 to the discharging end 349.

In some embodiments, inner and outer walls of each of the suction channel assembly 340 and the forward channel assembly 345 are curved outwardly (toward the rear side of the housing 310 and toward the front side of the housing 310, respectively), and the channel walls of each of the rearward channels 341A-D and the forward channels 343A-D are similarly curved outwardly (toward the rear side of the housing 310 and toward the front side of the housing 310, respectively). Other configurations for the walls are also possible, for example, the curvature of the suction channel assembly can be the same or different from the curvature of the forward channel assembly. In some implementations, a width of the forward channels 343A-D at one of the drawing end 347 or the discharging end 349 of the forward channel assembly 345 is the same as a width of the rearward channels 341A-D at the drawing end 344 or the discharging end 346 of the suction channel assembly 340. In some implementations, each of the forward channels 343A-D has a same width, at one of the drawing end 347 or the discharging end 349 of the forward channel assembly 345. In some implementations, each of the rearward channels 341A-D has a same width, at one of the drawing end 344 or the discharging end 346 of the suction channel assembly 340.

The blast cell 302 includes the intake plenum 350. The intake plenum 350 provides a conduit for air flow between the rearward region 362 and the forward region 364 of the bay space 312. The intake plenum 350 has a forward end 352 and a rearward end 354. The forward end 352 can be in fluid communication with the forward region 364 of the bay space 312, and the rearward end 354 can be in fluid communication with the rearward region 362 of the bay space 312. In FIGS. 3A-E, the intake plenum 350 is arranged at the top side 326 of the housing 310 and extends across the bay space 312. In other embodiments, the intake plenum 350 can be arranged in different locations, such as at the bottom side 327 of the housing while extending across the bay space 312.

The fan 330 can be arranged relative to the intake plenum 350 to create air flow from the rearward end 354 of the intake plenum 350 toward the forward end 352 of the intake plenum 350. In some embodiments, the fan 330 is arranged adjacent the rearward end 354 of the intake plenum 350. For example, the fan 330 is arranged in the passage of the intake plenum 350 close to the rearward end 354 that is in fluid communication with the plurality of rearward channels 341. In embodiments where the plurality of rearward channels 341 is arranged between the rearward region 362 of the bay space 312 and the rearward end 354 of the intake plenum 350, the fan 330 operates to draw air from the rearward region 362 of the bay space 312 into the rearward end 354 of the intake plenum 350 through the fluid pathways defined by the rearward channels 341. In other embodiments, the fan 330 can be arranged in different locations within the intake plenum 350.

The intake plenum 350 can have an air inlet portion 356 to which air is drawn into the intake plenum 350 at the rearward end 354. In some embodiments, the air inlet portion 356 is formed at a corner where the rear side 325 of the housing 310 and the top side 326 of the housing 310 meet. The air inlet portion 356 is fluidly connected to a discharging end 346 of the suction channel assembly 340. The intake plenum can also have an air outlet portion 358 to which air is discharged from the intake plenum 350 at the forward end 352. In some embodiments, the air outlet portion 358 is formed at a corner where the front side 322 of the housing 310 and the top side 326 of the housing 310 meet. The air outlet portion 358 is fluidly connected to the forward region 364 of the bay space 312. The air outlet portion 358 is configured to direct air passing through the intake plenum 350 into the forward region 364 of the bay space 312, for example by forward channels 343 as illustrated in FIGS. 3A-3E. In some implementations, only rearward or forward channels are implemented in the blast cell and the air outlet portion 358 is fluidly connected to the forward region 364 of the bay space 312 by other means.

The implementation of air flow guides in the blast cell 302 reduces turbulent air and enhance air circulation in the blast cell 302. Air flow guides including channels, curved conduits, vanes, or ramps can be arranged at one or more corners or sharp portions in the housing 310 and configured to streamline air flow and reduce turbulence. As illustrated in FIG. 3B, in some embodiments, the air outlet portion 358 is configured to provide a curved conduit 372 with opposite inner and outer curved walls 374 and 376 to turn air flow at the corner. As described herein, the air outlet portion 358 can include the curved conduit 372 as an air flow guide configured to streamline air flow at the corner and reduce turbulence. FIG. 3B shows a curved conduit 372 at the top front portion of the blast cell 302 housing 310 and at the top rear portion of the blast cell 302 housing. In some implementations, a curved conduit is implemented at only one of the top front and the top rear portions of the housing 310, for example in FIG. 1, a curved conduit is illustrated at the top front portion of the housing 110 only. In some implementations, no curved conduit is implemented within the housing 310. For example, in FIG. 2, there are no curved conduits illustrated at the corners, and the corners of the housing 210 are square.

Figure 3A:
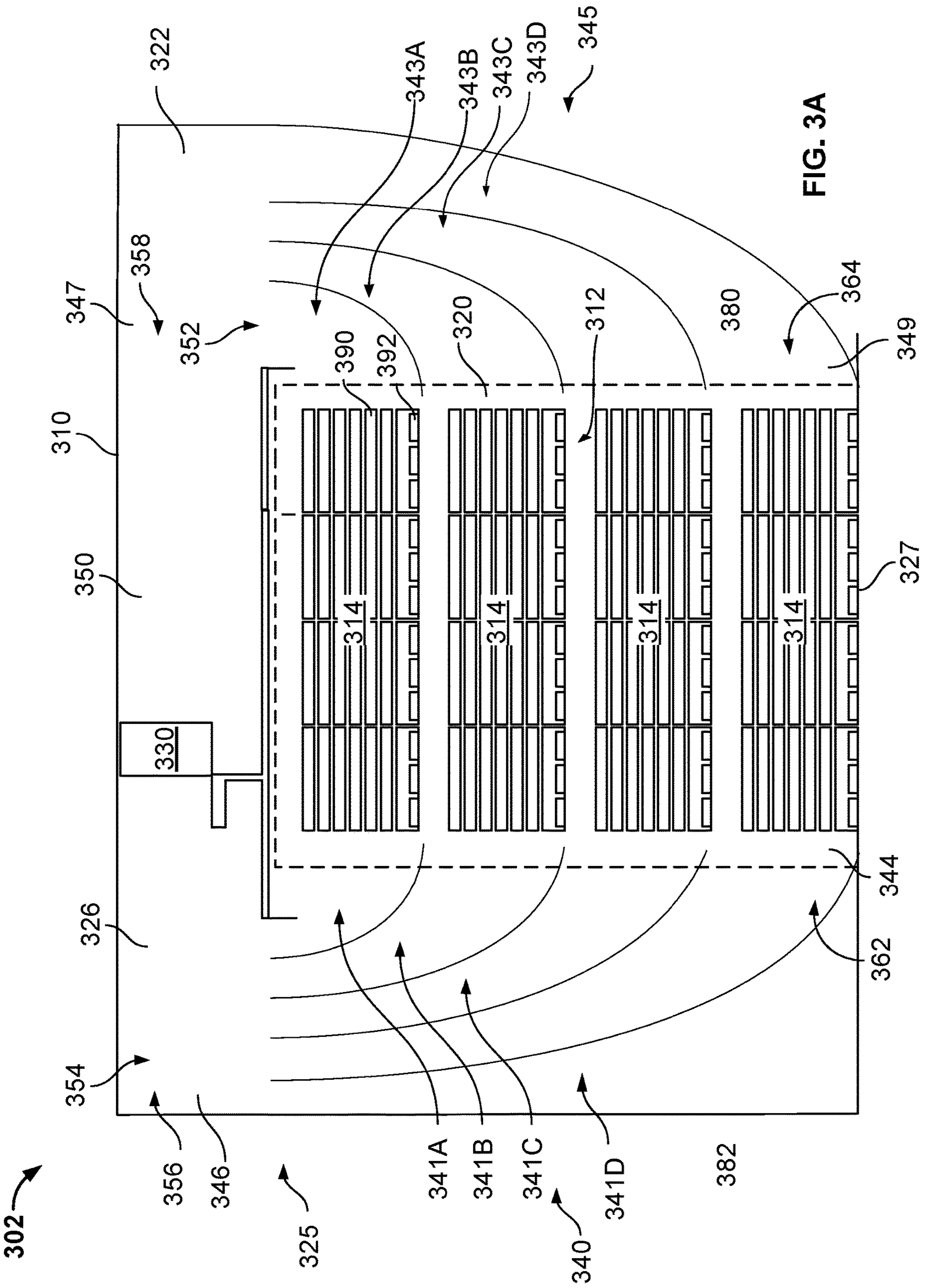
FIG. 3A shows a side cross-sectional view of an example blast cell having forward and rearward channels.
Figure 3B:
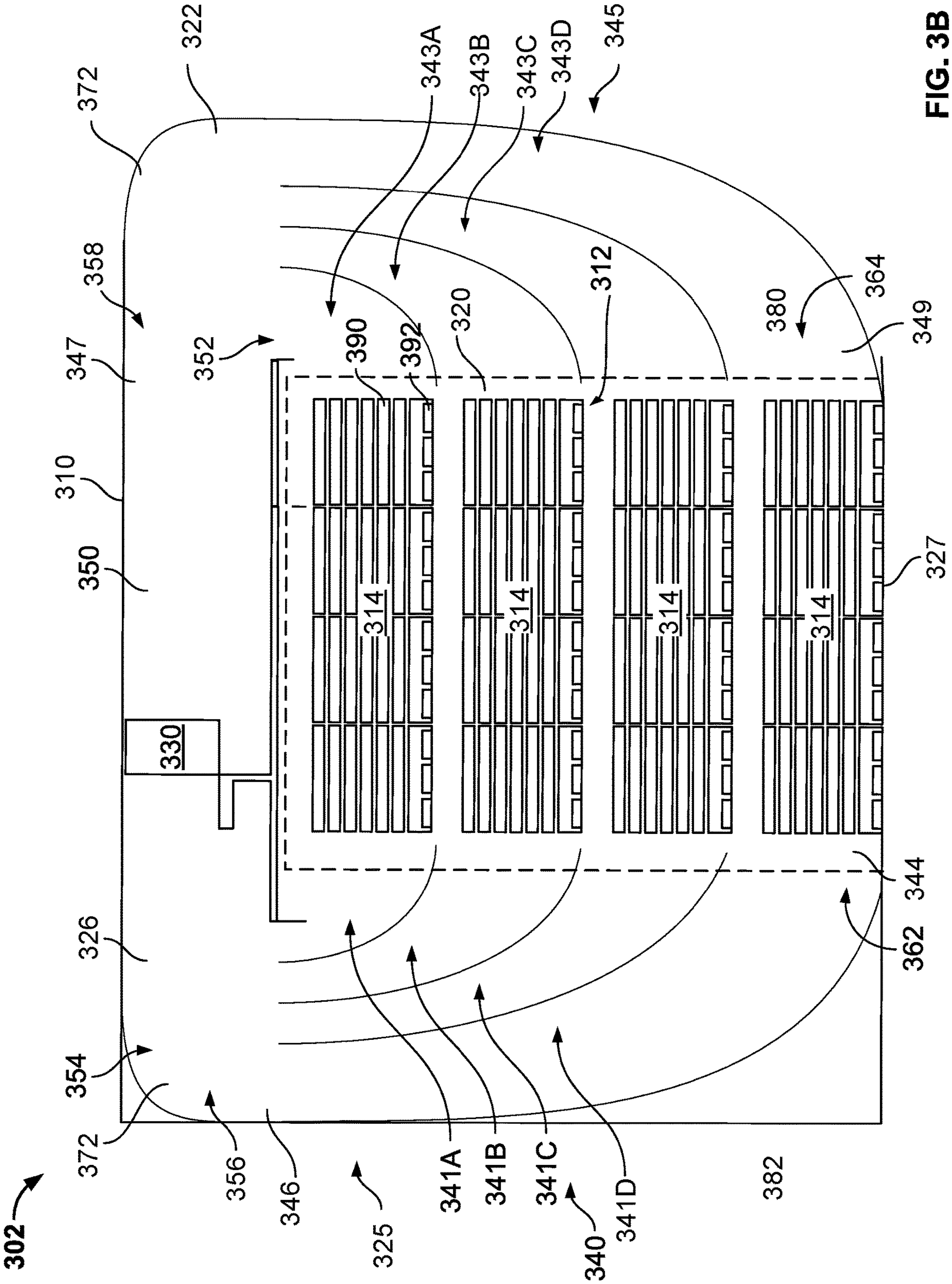
FIG. 3B shows a side cross-sectional view of an example blast cell having forward and rearward channels and airflow vanes.

In some embodiments, as illustrated in FIG. 3A, the channel walls of the suction channel assembly 340 do not extend into the air inlet portion 356 and the channel walls of the forward channel assembly 345 do not extend into the air outlet portion 358. In these embodiments, the air drawn from the discharging end 346 of the suction channel assembly 340 turns at the corner and flows into the fan 330.

Figure 3C:
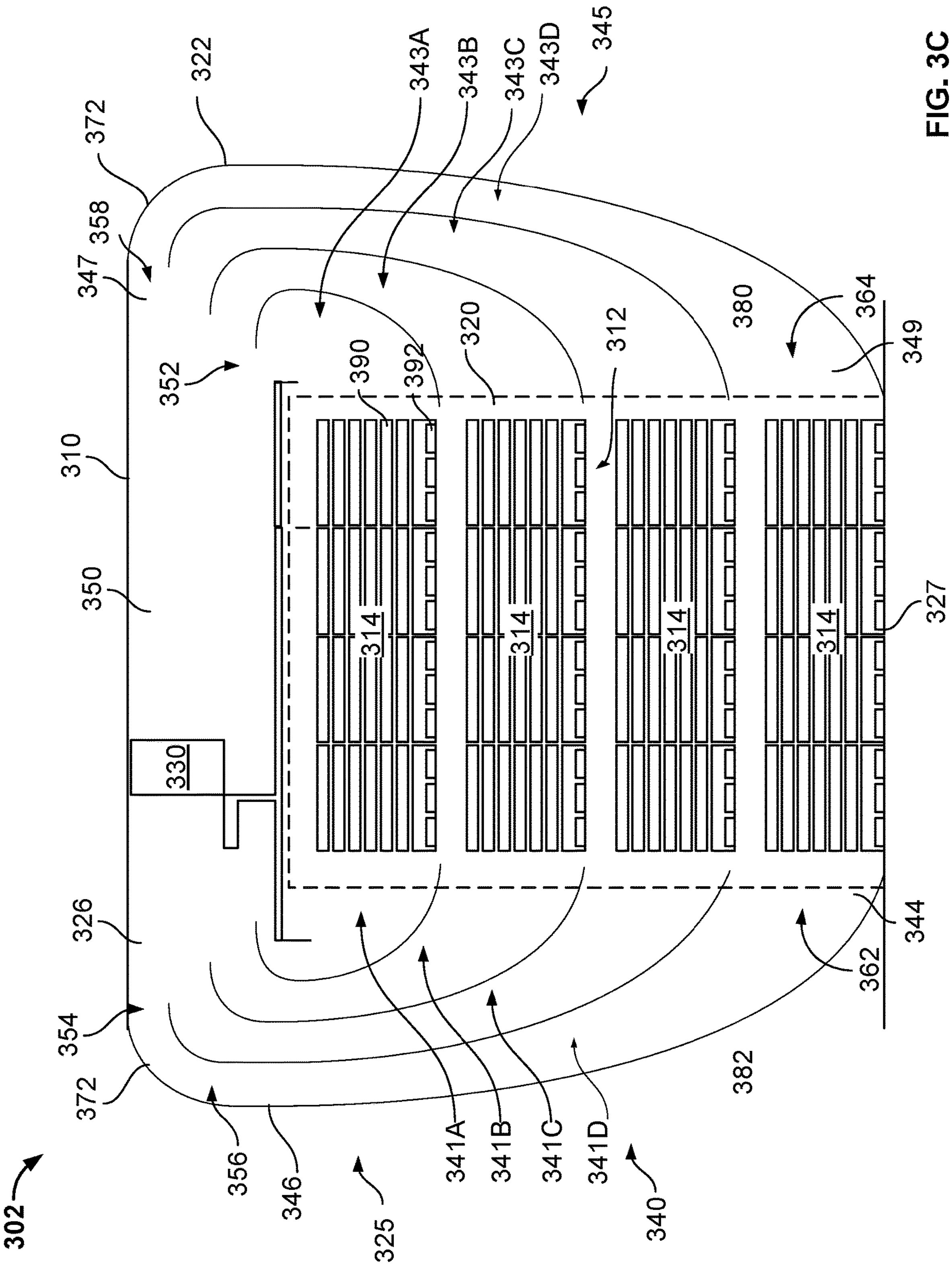
FIG. 3C shows a side cross-sectional view of an example blast cell having forward and rearward channels extending to a plenum.

In other embodiments, the rearward channel walls of the suction channel assembly 340 can extend into the air inlet portion 356 to guide air flow between the suction channel assembly 340 and the fan 330 at the corner. In some embodiments, the forward channel walls of the forward channel assembly 345 can extend into the air outlet portion 358 to guide air flow between the air outlet portion 358 and the forward end of the bay space 312. For example, FIG. 3C illustrates a blast cell 302 having both the rearward channel walls of the suction channel assembly 340 extending into the air inlet portion 356 and the forward channel walls of the forward channel assembly 345 extending into the air outlet portion 358. In yet other embodiments, the rearward channel walls of the suction channel assembly 340 can extend into the air inlet portion 356 and up to, or close to, the inlet of the fan 330 to further guide the air flow at the corner.

Figure 3D:
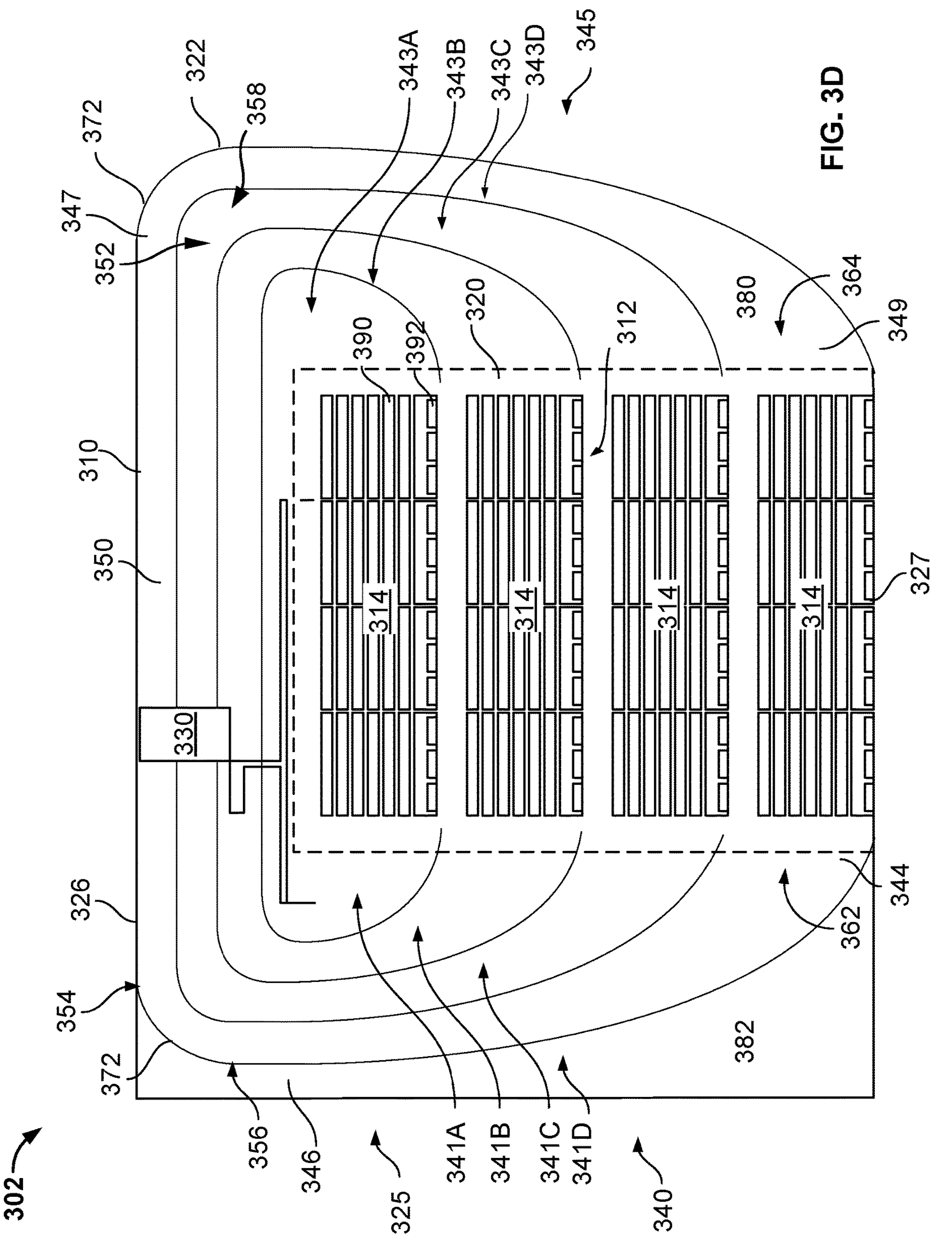
FIG. 3D shows a side cross-sectional view of an example blast cell having forward and rearward channels extending throughout the plenum.

In some implementations, the channel walls of the suction channel assembly 340 and the forward channel assembly 345 extend up to the inlet of the fan 330 and continue on the other side of the fan 330 through the plenum 350 such that the channels of the suction channel assembly 340 and the forward channel assembly 345 are continuous. For example, FIG. 3D shows a side cross-sectional view of an example blast cell 320 having forward channels 343 and rearward channels 341 extending throughout the plenum 350.

Although not depicted, an air flow guide can be provided to other locations in the blast cell 302 to reduce turbulence in air circulation. In some implementations in which one or both of the suction channel assembly 340 or the forward channel assembly 345 are omitted from the blast cell 302, a turning vane assembly (not shown) can be implemented at the top rear and front corners of the blast cell 302 to prevent turbulence and to guide the airflow into the fan 330 and through the plenum 350 into the forward region 364 of the bay space 312. The turning vane assembly can include a plurality of vanes defining curved air passages 380 and 382 between the inner and outer curved walls of the air outlet portion 358 of the intake plenum 350. In some embodiments, the vane walls can be spaced apart equally so that the turning vanes have the same width along the lengths of the turning vanes, and in other implementations, at least one of the vane walls is spaced apart at a different distance. In some implementations, the turning vane assembly, a ramp, and/or other similar features can be provided at a corner in the air inlet portion 356 of the intake plenum 350 to guide air flow turning from the outlet of the suction channel assembly 340 into the fan 330.

Figure 3E:
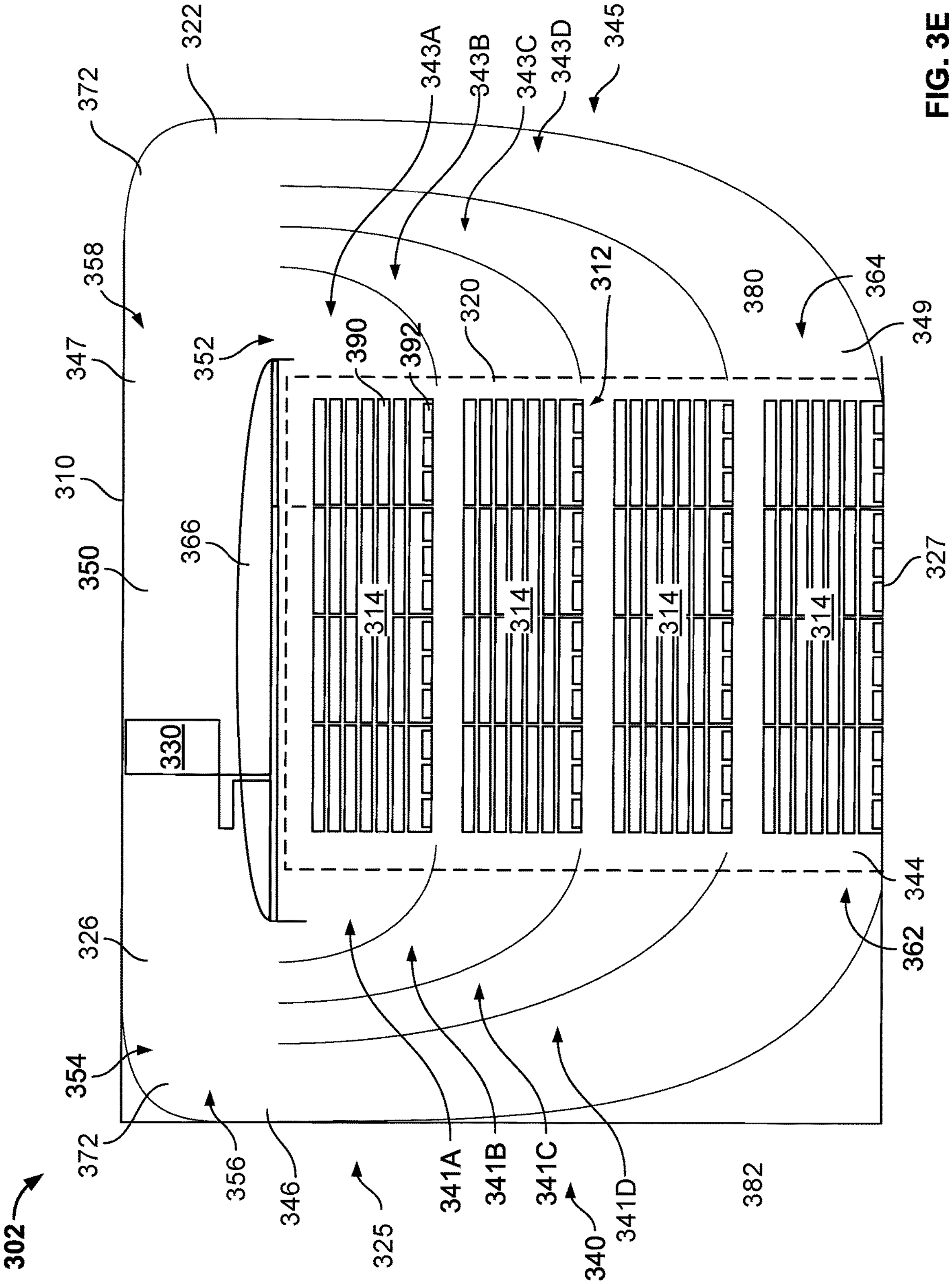
FIG. 3E shows a side cross-sectional view of an example blast cell having forward and rearward channels and a spacing structure.

In some implementations, the intake plenum 350 can be arranged to be spaced apart from the bay space 312. FIG. 3E shows a side cross-sectional view of an example blast cell 302 having forward channels 343 and rearward channels 341 and a spacing structure 366. For example, the intake plenum 350 is arranged at a distance from the bay space 312 with the spacing structure 366 positioned between the intake plenum 350 and the bay space 312. In some embodiments, the spacing structure 366 is configured to provide spacing between the intake plenum 350 and the bay space 312 to allow the channels 341 to gradually extend from the bay space 312 and the fan 330, and to allow channels 343 to gradually extend from the plenum 350 to the bay space 312 thereby creating streamlined air flow passage without abrupt turns into the airflow path.

The spacing structure 366 provides spacing between the intake plenum 350 and the bay space 312 so that the intake plenum 350 is not abutted with the boundary wall of the bay space 312. The spacing structure 366 can provide an additional room for the suction channel assembly 340 to increase the length of its extension from the bay space 312 toward the fan 330. Such an extended length of the suction channel assembly 340 between the bay space 312 and the fan 330 allows providing streamlined curvatures in air passages 380 and 382 and removing sharp edges or curves throughout the suction channel assembly 340 that would cause air to turn abruptly. The spacing structure 366 can be at least partially hollow in some embodiments. Other embodiments of the spacing structure 366 can be configured as a solid body, or a hollow body filled with elements or materials.

Figure 4:
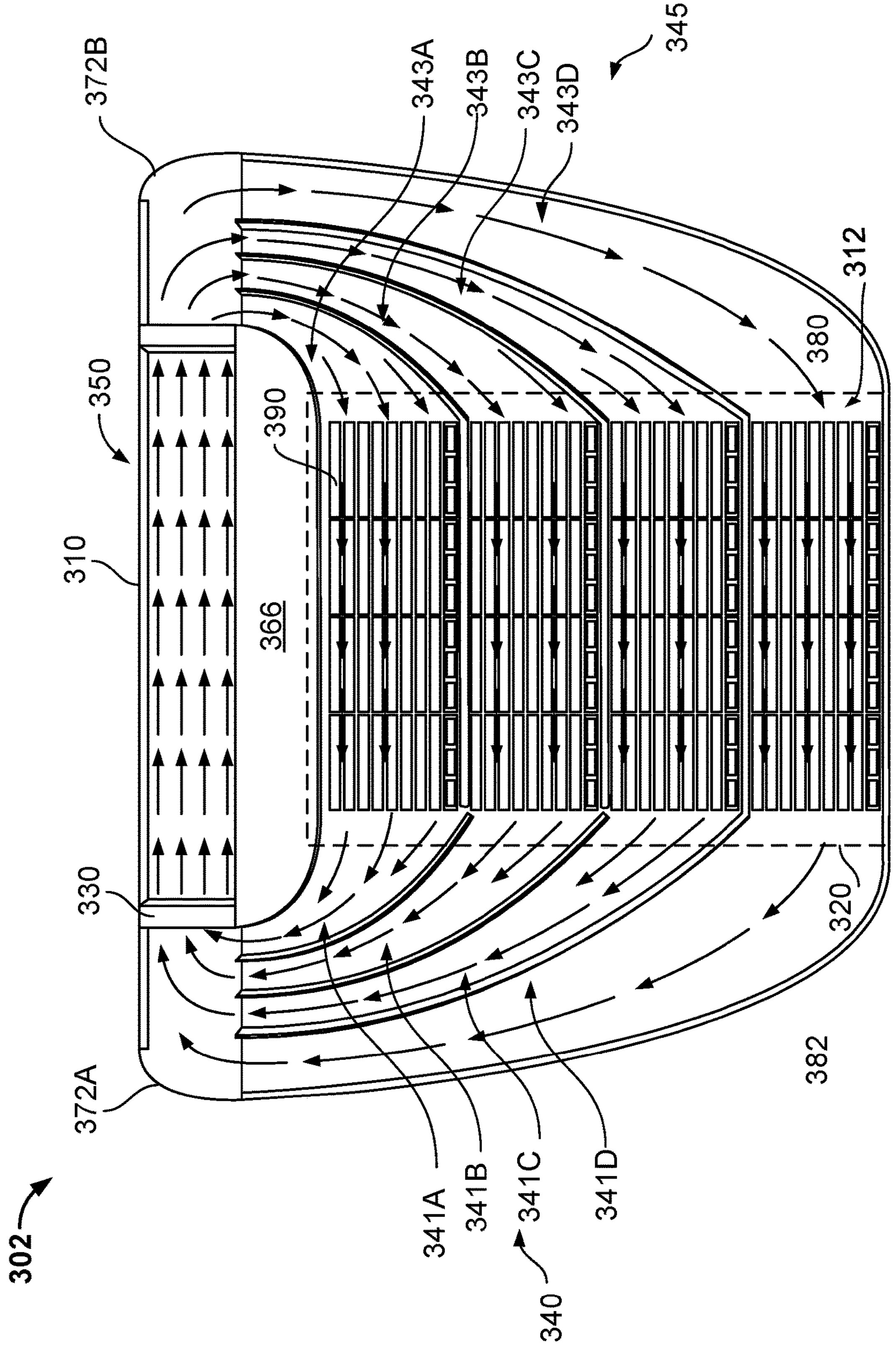
FIG. 4 shows a side cross-sectional view of airflow through an example blast cell having forward and rearward channels and airflow vanes.

FIG. 4 shows a side cross-sectional view of airflow through the example blast cell 302 of FIG. 3E having forward channels 343 and rearward channels 341, curved conduit airflow guides 372A and 372B, and a spacing structure 366. The arrows of FIG. 4 illustrate the airflow path from the bay space 312 through the suction channel assembly 340 to the fan 330. The presence of the spacing structure 366 between the plenum 350 and the bay space 312 allows the channels of both the forward channels 343 and rearward channels 341 to curve more gently toward the top of the blast cell 302 to prevent kinks and turbulence of the airflow as the air enters and leaves the plenum. Similarly, the presence of the curved conduit 372A in the rear corner of the blast cell 302 as the air bends toward the fan 330 prevents turbulence and smoothly directs the air to the fan 330. The airflow path then moves through the plenum 350, is similarly guided by the curved conduit 372B in the front corner of the blast cell 302 into the channels 343 of the forward channel assembly 345 and is then directed through the channels 343 into the bay space 312 to cool the items 390 in the bay space 312.

Figure 5:
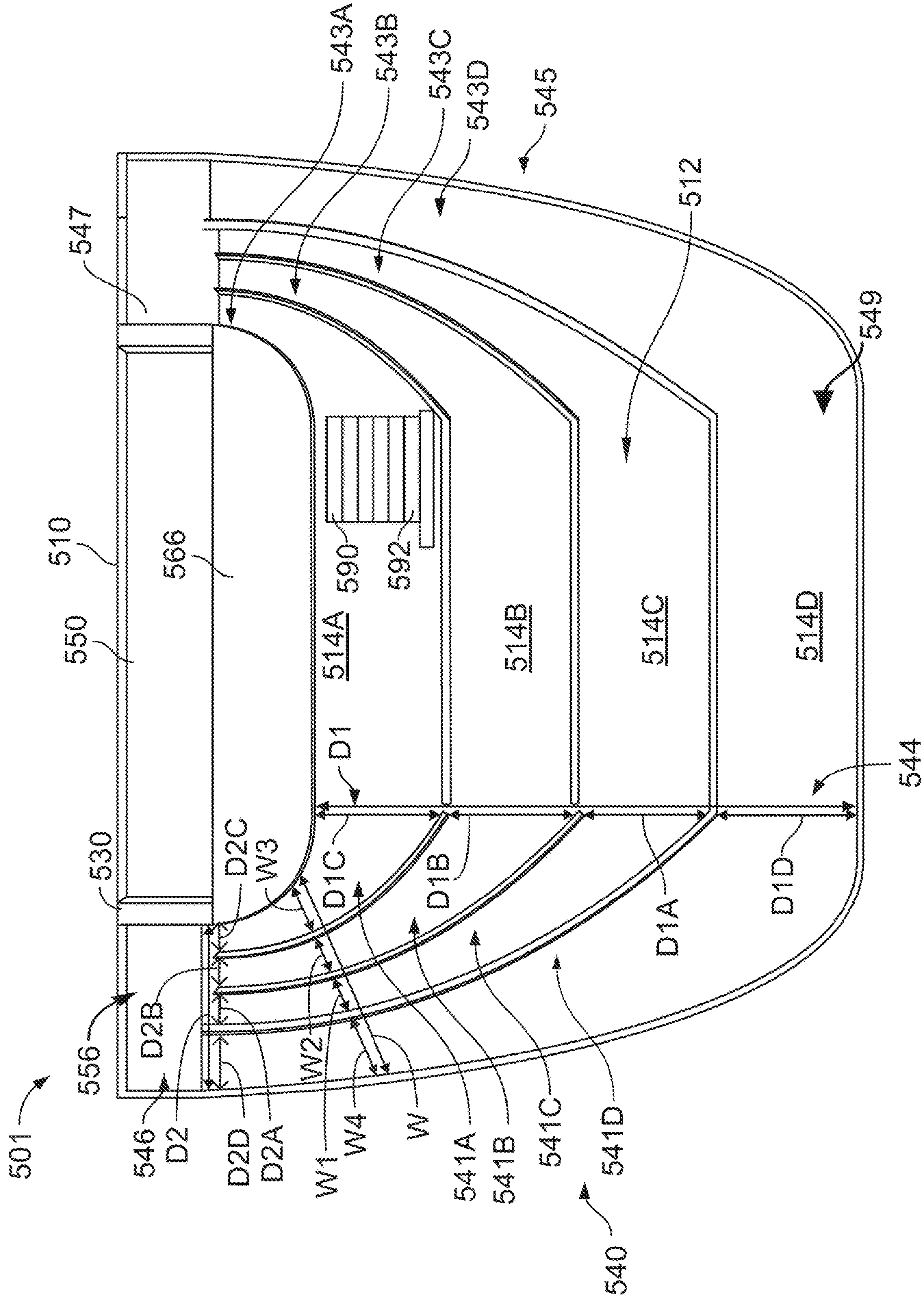
FIG. 5 shows a side cross-sectional view of an example blast cell having forward and rearward channels.

FIG. 5 shows a side cross-sectional view of an example blast cell 501 having forward and rearward channels, the blast cell 501 being substantially similar to blast cell 302 illustrated in FIG. 3A, and having similar features. In some embodiments, the suction channel assembly 540 is shaped to be narrower at the discharging end 546 (close to the fan 530) than the drawing end 544 (close to the bay space 512) to create a funnel effect (under Bernoulli's principle), thereby increasing suction power at the discharging end 546 close to the fan 530. In other words, the drawing end 544 is configured to be larger in dimension than the discharging end 546. For example, the drawing end 544 has a neck width D1 larger than a neck width D2 of the discharging end 546. The width W of the suction channel assembly 540 can gradually become smaller from the neck width D1 of the drawing end 544 to the neck width D2 of the discharging end 546. In some implementations, the neck widths of the forward channel assembly 545 are also shaped to be narrower at the drawing end 547 and larger at the discharging end 549, such that the width of the forward channel assembly 545 gradually becomes larger from the drawing end 547 to the discharging end 549 where the airflow enters the bay space 512.

The neck width D1 of the drawing end 544 can be sized to accommodate at least a part of the height of the bay space 512. Similarly a neck width of the discharging end 549 of the forward channel assembly can be sized to accommodate at least a part of the height of the bay space 512, so that the neck width of each channel is equal to a distance between layers in the bay space 512. The neck width D2 of the discharging end 546 can be sized to be fluidly connected to the air inlet portion 556 of the intake plenum 550 before the fan 530. The neck width of the discharging end 546 of the suction channel assembly 540 and the drawing end 547 of the forward channel assembly 545 can range between about 100 inches and about 500 inches in some embodiments, or between about 200 inches and about 300 inches in other embodiments. In yet other embodiments, the neck width of the discharging end 546 of the suction channel assembly 540 and the drawing end 547 of the forward channel assembly 545 can be about 240 inches. Other sizes of the neck width are also possible. The neck width D2 of the of the discharging end 546 of the suction channel assembly 540 can range between about 20 inches and about 200 inches in some embodiments, or between about 30 inches and about 100 inches. The neck width of the drawing end 547 of the forward channel assembly 545 can be the same. In yet other embodiments, the neck width D2 can be about 48 inches. Other sizes of the neck width D2 are also possible, and the discharging end 546 of the suction assembly and the drawing end 547 of the forward channel assembly 545 may have the same or different width.

Similarly, a drawing end 594 of each channel 541 of the suction channel assembly 540 is configured to be larger in dimension than a discharging end 596 of that channel 541. For example, the drawing end 594 of each channel 541 has a neck width D1A, D1B, D1C, or D1D larger than a neck width D2A, D2B, D2C, or D2D of the discharging end 546 of that channel 541. The neck width D1A, D1B, D1C or D1D of the drawing end 544 of each channel 541 can be sized to accommodate at least part of the height of each level 514A, 514B, 514C or 514D of the bay space 512. The neck width D2A, D2B, D2C, or D2D of the discharging end 546 of each channel 541 can be sized to be fluidly connected to the air inlet portion 556 of the intake plenum 550 before the fan 530. The width W1, W2, W3, or W4 of each channel 541 can gradually become smaller from the neck width D1A, D1B, D1C, or D1D of the drawing end 544 to the neck width D2A, D2B, D2C, or D2D of the discharging end 546. The dimensions of each channel 543 of the forward channel assembly 545 can be the same or different than the channels 541 of the suction channel assembly 540, and each channel 543 may have similar relative sizes.

In some embodiments, the neck widths D1A, D1B, D1C, or D1D of the drawing ends 594 of the channels 541 are identical. In other embodiments, at least one of the neck widths D1A, D1B, D1C, or D1D of the drawing ends 594 of the channels 541 is different from the other neck width(s). In some embodiments, the neck widths D2A, D2B, D2C and D2C of the discharging ends 596 of the channels 541 are identical. In other embodiments, at least one of the neck widths D2A, D2B, D2C, or D2D of the discharging ends 596 of the channels 541 is different from the other neck width(s).

The neck width D1A, D1B, D1C, D1D each can range between about 30 inches and about 200 inches in some embodiments, or between about 70 inches and 100 inches in other embodiments. In yet other embodiments, the neck width D1A, D1B, D1C, or D1D can be around 80 inches respectively. Other sizes of the neck width D1A, D1B, D1C, or D1D are also possible. The neck widths D2A, D2B, D2C, and D2D each can range between about 5 inches and about 80 inches in some embodiments, or between about 8 inches and 40 inches in other embodiments. In yet other embodiments, the neck width D2A, D2B, D2C, and D2D can be around 16 inches respectively. Other sizes of the neck width D2A, D2B, D2C, and D2D are also possible. The various geometries of the channel necks alter the airflow path through the bay space 512 of the blast cell 502 and can influence the speed or uniformity of chilling throughout the bay space 512.

Figure 6:
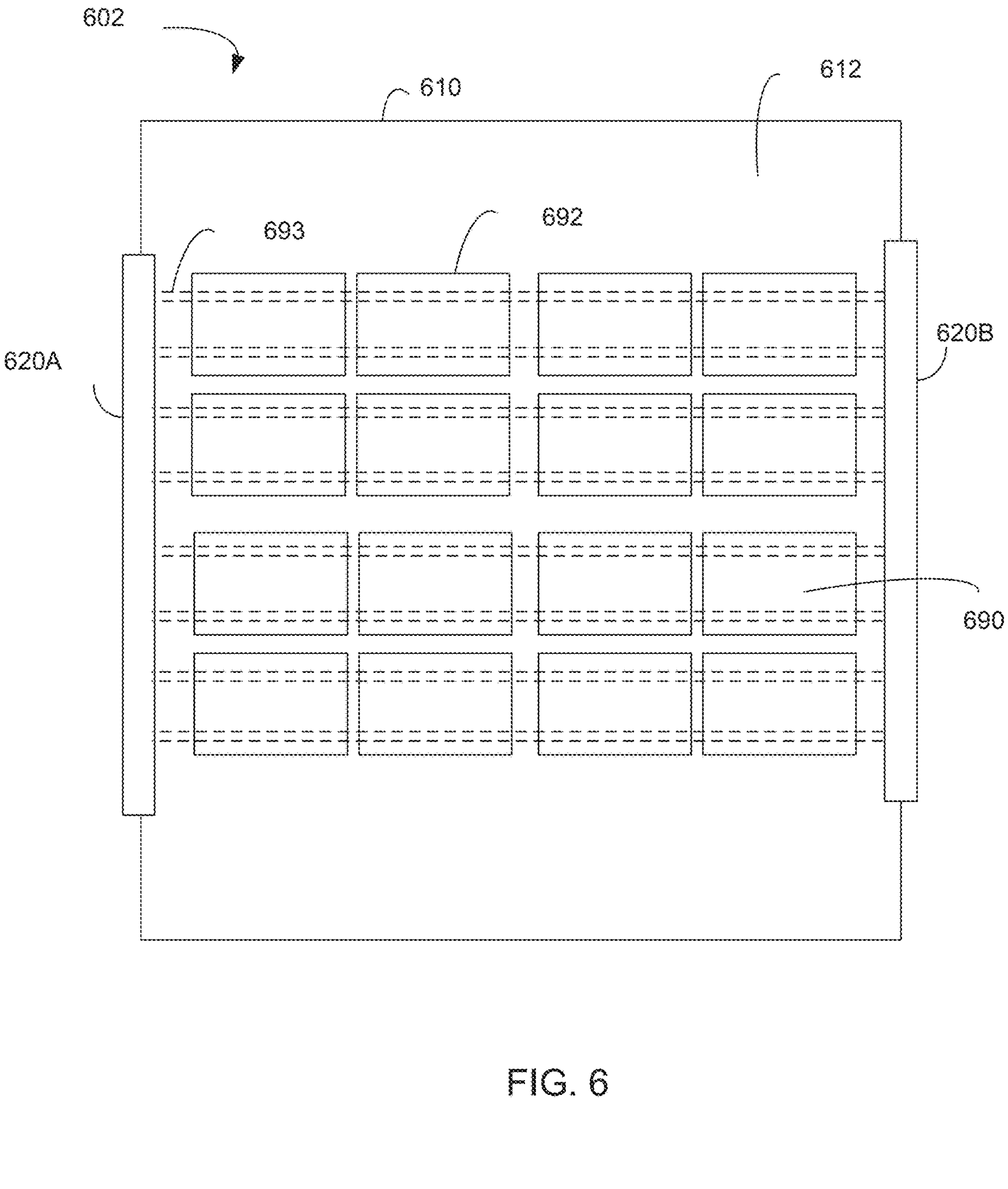
FIG. 6 shows a top cross-sectional view of an example pallet arrangement in a bay space of an example blast cell.

FIG. 6 shows a top cross-sectional view of an example pallet arrangement in a bay space 612 of an example blast cell 602. The blast cell 602 includes a housing 610 defining a bay space 612 into which items 690 can be loaded and unloaded through a first door 620A and a second door 620B formed in the sides of the housing 610. The loading and unloading of the bay space 612 through the side doors 620A and 620B results in loading and unloading in a direction lateral or perpendicular to the intended direction of airflow through the bay space 612. The bay space 612 includes an array of pallet positions arranged in rows and columns, and the bay space 612 may further include additional layers (not shown) having additional pallet positions. Items 690 are arranged on pallets 692 at the pallet positions. Rails 693, or another rack or racking system, are positioned within the bay space 612 for holding the pallets 692. The rails 693 can run across the bay space 612 from one side to the other perpendicular to a line from the front of the blast cell 602 to the rear of the blast cell. The rails 693 may extend to the first door 620A and to the second door 620B.

The first door 620A and to the second door 620B are sized to allow all pallets 693 in each pallet position to be accessed through at least one door. In some implementations, the door is equal to the size of the bay space 612 blast cell 602. For example, as shown in FIG. 6, there are 16 pallet positions arranged in 4 rows of 4 pallets 693. In some implementations, all pallets to the left of a midline down the center of the bay space 612 are accessible through the first door 620A (8 pallet positions) and all pallet positions to the left of the midline down the center of the bay space 612 are accessible through the second door 620B (8 pallet positions). In some implementations, the blast cell 602 includes four layer of 16 pallet positions, meaning that the blast cell 602 can fit 64 pallets. In other implementations, the blast cell 602 can include more or less than 16 pallet positions per level, and may have more or less than four levels.

Figure 7:
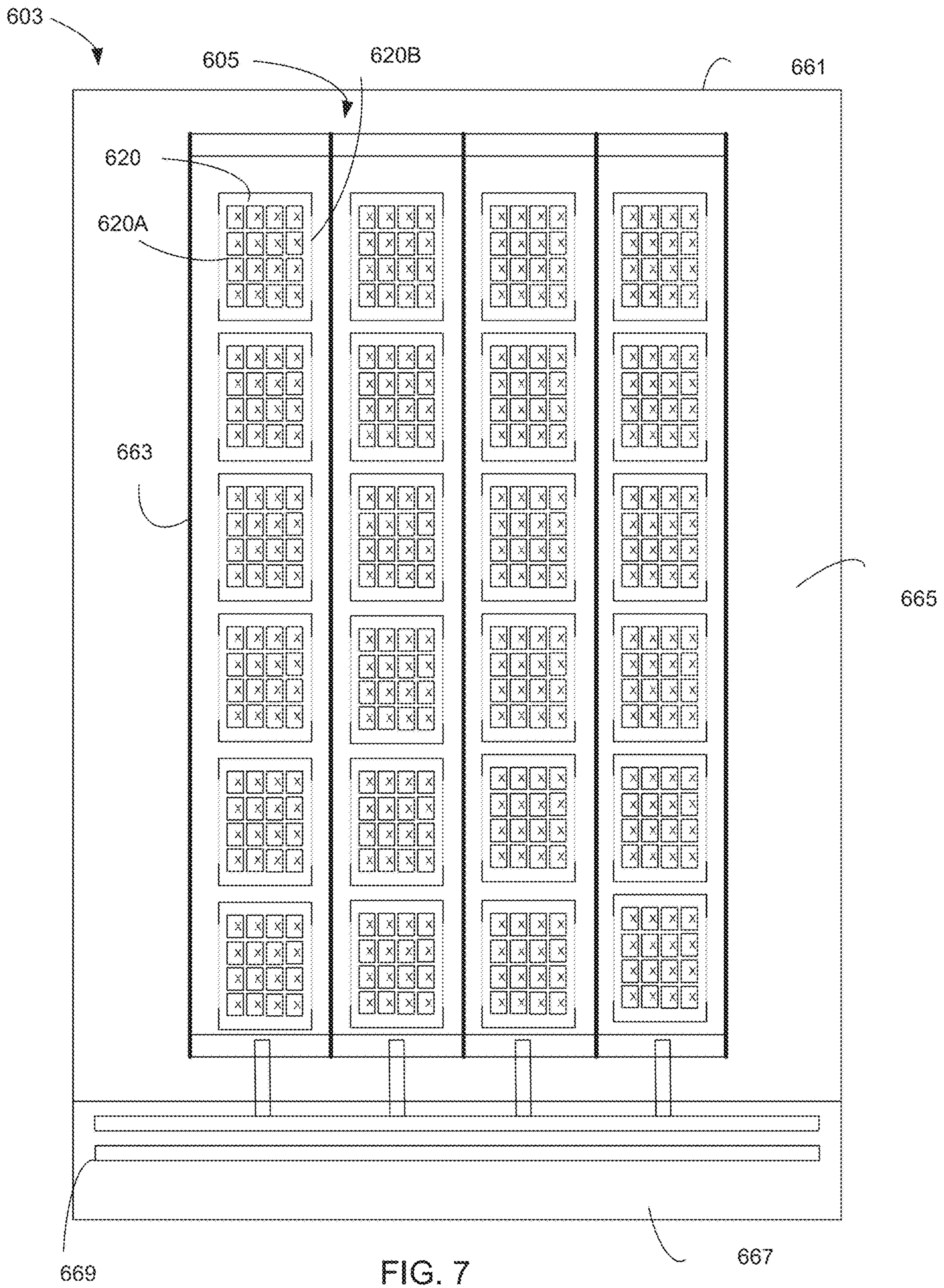
FIG. 7 shows a top cross-sectional view of an example arrangement of blast cells in a blast cell system.

In some embodiments, the blast cells 602 are separated from each other and structured as a standalone apparatus. For example, the blast cells 602 are modularized so that the blast cells 602 are structurally identical or similar to each other. In some implementations, blast cells are installed together, into a side-by-side arrangement forming a blast cell system. FIG. 7 shows a top cross-sectional view of an example arrangement of blast cells 602 in a blast cell system 603. The blast cell system 603 includes a storage facility 661 having a blast chilling space 665 and a loading space 667, a plurality of blast cells 602 arranged into a blast cell array 605 having columns and rows, and crane rails 663 positioned between adjacent rows of the blast cell array 605 and outside of the outer rows.

In the blast cell system 603, any desired number of blast cells 602 can be installed together, in an array, for example an array of m×n blast cells 602 having m rows and n columns. The blast cell array 605 may have any number of blast cells 602. For example, in FIG. 7, there are four rows of six blast cells 602, meaning there are 24 blast cells 602 in the blast cell array 605. On each side of each blast cell 602 in the blast cell array 605 there is an aisle. For example, in FIG. 7 there are five aisles in total, including one on each end and three between the four rows of blast cells 602. Each aisle includes crane rails 663 on which autonomous cranes or other machines can travel to load and unload the pallets from the blast cells 602.

In other implementations, there may be more or less blast cells 602 in the blast cell array, for example 8 blast cells 602, 12 blast cells 602, 48 blast cells 602, 50 blast cells 602, 64 blast cells 602, 100 blast cells 602, or any other number of blast cells 602. The blast cells 602 may be any of the blast cells described above in FIGS. 1-6, and may have any combination of features described above with regard to these figures. In some implementations, all of the blast cells 602 in the blast cell array 605 have a same or similar design. In other implementations, all of the blast cells 602 in the blast cell array 605 are not the same design, and some blast cells 602 may have a different number of pallet positions, be a different size, have a different number of layers, or utilize different air flow control mechanisms. In some embodiments, the blast cells 102 are operated simultaneously under the same operational scheme. In other embodiments, at least one of the blast cells 102 is operable individually. For example, some blast cells 102 can be operated under different operational schemes from the other blast cells 102.

In some implementations, a blast cell system 603 having a larger number of smaller sized blast cells 602 allows the system to begin a freeze cycle for a blast cell when it is full in order to create a continuous flow of blast in the system and to spread the energy load of the warehouse across the day.

In the example blast cell system 603 illustrated in FIG. 7, the blast cell array 605 can be tens of feet wide and high, such as, for example, 10-100 feet wide and 10-50 feet high. The blast cell array 605 can be located inside storage facility 661, such as in a typical warehouse, and can rest on a concrete or similar floor. The storage facility includes blast chilling space 665 and loading space 667, coupled by conveyors 669. The loading space 667 may have entrances suitable for loading and unloading pallets from trucks or containers and for long-term or short-term storage of pallets. The loading space 667 may also include a control station, a processor, or other control mechanisms for controlling and overseeing loading and unloading of the blast cell array 605 in the blast chilling space 665.

Pallets are moved from the loading space 667 into the blast chilling space 667 by conveyors 669 or other mechanisms, such as forklifts or autonomous machines, robots, or vehicles. The conveyors 669 may be a network of conveyors, which may in some implementations be used to sort the pallets before transporting the pallets to a location within the blast chilling space 667. The blast chilling space 667 is typically kept in refrigerated conditions of −20° F. or lower, making it difficult for humans or conventional vehicles to operate in the blast chilling space 667 for long periods. The low temperatures increase the likelihood of movable components of vehicles and machinery becoming iced over and ceasing to work. Additionally, the possibility of icy conditions in the blast chilling space 667 can make working in the space dangerous for humans and for autonomous vehicles that may not be able to anticipate or react to ice in the path. Furthermore, the use of autonomous machines to load and unload blast cells 602 in the blast chilling space 667 which are not controlled by a central controller or are not confined in their movement increases the possibility of collisions and interference between various machines.

Figure 8:
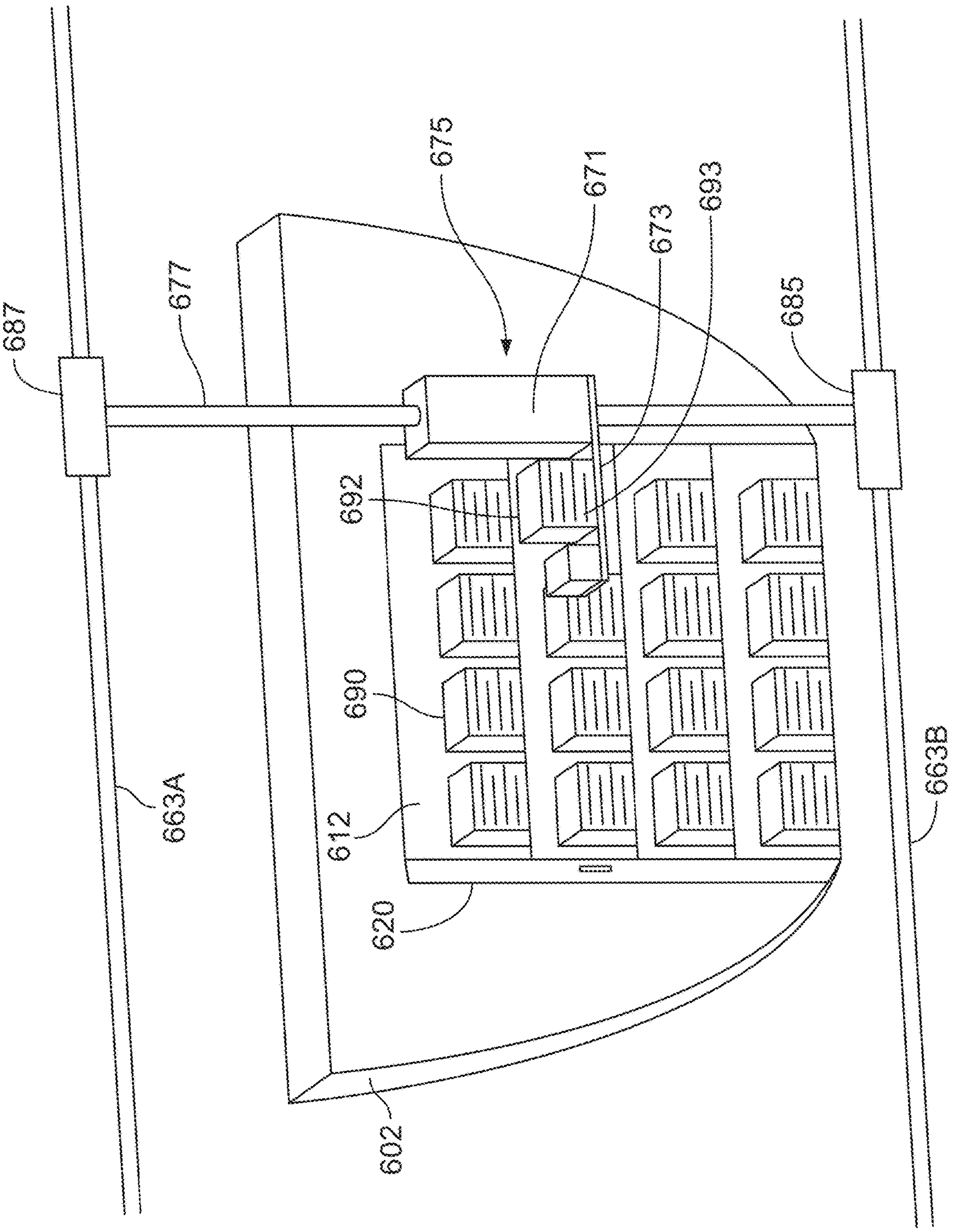
FIG. 8 shows a side perspective view of an autonomous crane system loading and unloading an example blast cell.

The use of autonomous machines confined to rail systems and controlled by a central controller capable of scheduling loading and unloading processes based on the freezing cycles of the blast cells improves the consistency of the process and lessens the incidence of accidents or machinery being rendered inoperable for long periods of time. Once the pallets are in the blast chilling space 667, the pallets can be retrieved by a storage and retrieval system, such as an autonomous machine, robot, or vehicle, to move the pallet to a particular blast cell 602. For example, as illustrated in FIG. 8, the autonomous machine may be a crane 671, in particular an aisle-switching crane. The crane 671 may include a crane component 675 and a retrieving component, such as a telescoping arm 673 capable of retrieving and supporting at least one pallet. The crane 671 or other autonomous machine moves through the blast chilling space 667 on the crane rails 663 positioned between adjacent rows of the blast cell array 605 and outside of the outer rows. In some implementations, the crane 671 can move only in a single row on the crane rails 663. In other implementations, the crane 671 can move between multiple rows using row or aisle-switching technologies. In some implementations, there is one crane 671 in each aisle of the blast cell array 605. The autonomous machine or vehicle operates externally to the bay space 612 so that there may not be movable components within the bay space 612 other than the fan 630.

In some implementations, the crane 671 can access pallets within a blast cell 602 on both sides of the aisle the crane is moving in. The ability of a crane 671 on either side of the blast cell 602 to access the bay space 612 of the blast cell 602 through the two doors 620A and 620B can create redundancy so that the blast cell can be loaded or unloaded faster than by a single crane 671, and so that the blast cell 602 can be partially or fully unloaded even if one crane 671 is rendered inoperable. The crane 671 may be able to move horizontally throughout the blast chilling space 667 on the crane rails 663, and also can be coupled to a vertical movement rail 677 to enable the crane 671 move vertically up and down to access multiple layers 614 of the blast cell 602. The crane 671 can be stabilized by just lower crane rails 663B or by lower crane rails 663B and upper crane rails 663A, as illustrated in FIG. 8. The crane 671 can be coupled to the lower crane rails 663B via the vertical movement rail 677 by a lower connector 685 stabilizing the crane 671 on the rails and enabling movement along the lower crane rails 663B. Similarly, the crane 671 can be coupled to the upper crane rails 663A via the vertical movement rail 677 by an upper connector 687 stabilizing the crane 671 on the rails and enabling movement along the lower crane rails 663 stabilizing the crane 671 on the upper crane rails 663A and enabling movement along the upper crane rails 663A.

In some implementations, a crane can hold two pallets at a time, and can place the pallets two positions deep in the blast cell. The crane 671 can include a trolley or telescoping arm 673 that extends outward from the crane 671 in a direction perpendicular to the motion of the crane 671 in the crane rails 663 through the aisle. In some implementations, the trolley or telescoping arm 673 can engage with the internal rails 693 within the bay space 612 in order to access the pallets 692 from the bay space 612. The trolley or telescoping arm 673 can be sized to reach pallets through the first door 620A in a first half of blast cell 602 nearest the first door 620A. A second crane (not pictured) can reach the second half of the pallet positions of the blast cell 602 through the second door 620B.

The doors 620A and 620B can be controlled by the control system or processor controlling the loading and unloading scheme of the warehouse and can be timed with a scheduled arrival of a crane 671. In some implementations, the doors 620A and 620B are automatically controlled and will open when the blast cell 602 is ready to load or unload, and upon completion of the loading or unloading the doors will be closed until the products in the blast cell 602 are fully frozen. Automation of the door opening and closing eliminates a need for workers to facilitate loading and unloading or to be in the blast chilling space 665.

The number of blast cells 602 in the blast cell array 605, as well as the size of a single blast cell 602, allows for flexibility of the warehouse control system and the warehouse management system to put pallets that require a similar blast time together in a cell and optimize the total blast time and energy required to blast freeze the product.

Figure 9:
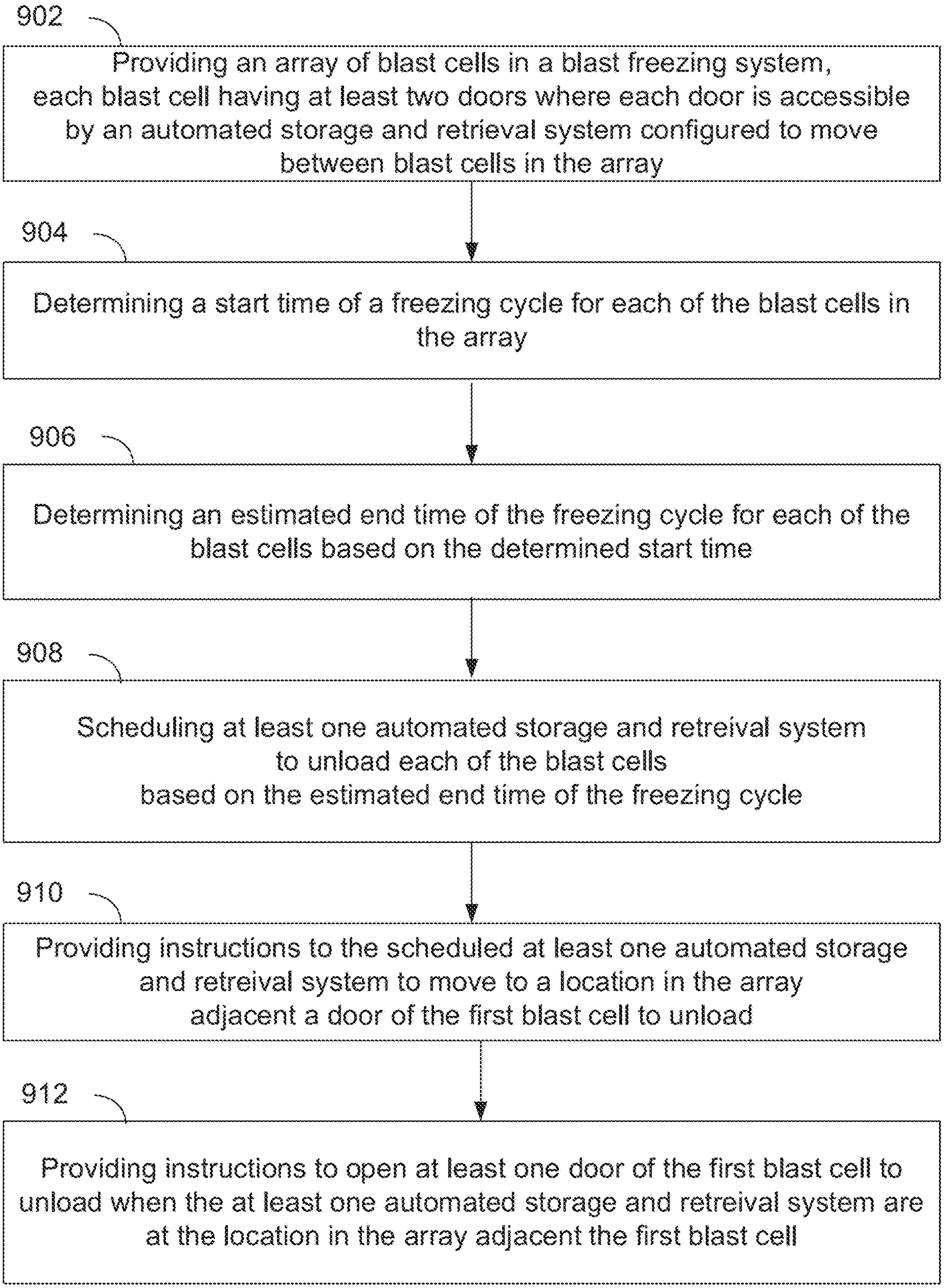
FIG. 9 shows a flowchart of an example method for operating a blast cell system.

Referring now to FIG. 9, an example method 900 for operating a blast cell system (such as blast cell system 603) is described. In general, the method 900 involves optimizing use of the blast cell system through efficient scheduling of unloading and loading of the blast cells based on the estimated time for a freezing cycle for each blast cell.

At step 902, an array of blast cells are provided in a blast freezing system, each blast cell having at least two doors, each door accessible by an automated crane system configured to move between blast cells in the array. In some implementations, the array of blast cells includes a plurality of rows and columns of blast cells arranged side-by-side with crane rails positioned in between the columns of blast cells to allow a crane to access blast cells on either side through the blast cells doors for loading and unloading of pallets of goods. In some implementations, the doors are positioned on opposing sides of the blast cell bay space. In some implementations, the crane system can reach into the blast cell to load or unload goods at least two pallet positions deep toward a center of the blast cell. In some implementations, the crane system includes telescoping components or shuttles that can reach more than two pallet positions deep toward a center, or beyond a center, of a blast cell.

At step 904, a start time of a freezing cycle for each of the blast cells in the array is determined. The start time of the freezing cycle may be based on freezing cycles which have already begun, a type or amount of goods in the blast cell, an arrival time of goods, a departure time of goods, or any other relevant factor. At step 906, an estimated end time of the freezing cycle for each of the blast cells in the array is determined based on the start time determined in step 904. The estimated end time of the freezing cycle may be determined by an algorithm which accounts for any of a type of good in the blast cell, an amount of goods in the blast cell, an average temperature of the goods in the blast cell, an efficiency of the fan and/or evaporator or other component of the blast cell, or any other relevant factor.

Typically, the process of blast freezing the product in the blast cell will take somewhere between 24 and 72 hours. During the freezing cycle, the blast cell cannot be opened without disrupting the freezing process, so pallets cannot be loaded or unloaded into the blast cell during the freezing cycle duration. To make sure the warehouse has sufficient automation capacity to move pallets in and out of the blast cells that are empty or ready to unload, cranes or other autonomous vehicles are utilized. In some implementations, the cranes are aisle switching cranes.

At step 908, at least one automated crane is scheduled to unload each of the blast cells in the system based on the estimated end time of the freezing cycle. At step 910, instructions are provided to the scheduled crane to move to a location in the array adjacent a door of a first blast cell to unload. At optional step 912, instructions are further provided to at least one door of the first blast cell to open such that the crane can unload the contents of the blast cell when they arrive at the location in the array adjacent the first blast cell. In other embodiments, the instruction to the door to open is provided by the arrival of the crane from the crane itself, but proximity sensor, Bluetooth connection, or other means.

By scheduling the loading and unloading, the power usage of the blast chilling operation can be spread throughout the day, with the blast cells working continuously and cranes used efficiently. The control algorithm may stagger the start times of the blast cell freezing cycles to maximize crane usage time so that each crane is continuously occupied by loading or unloading blast cells along the aisle the crane is intended to service. The blast cell bay spaces can also be more quickly loaded and unloaded by the use of the crane in each aisle adjacent the blast cell, resulting in higher throughput of the blast cell system.

Figure 10:
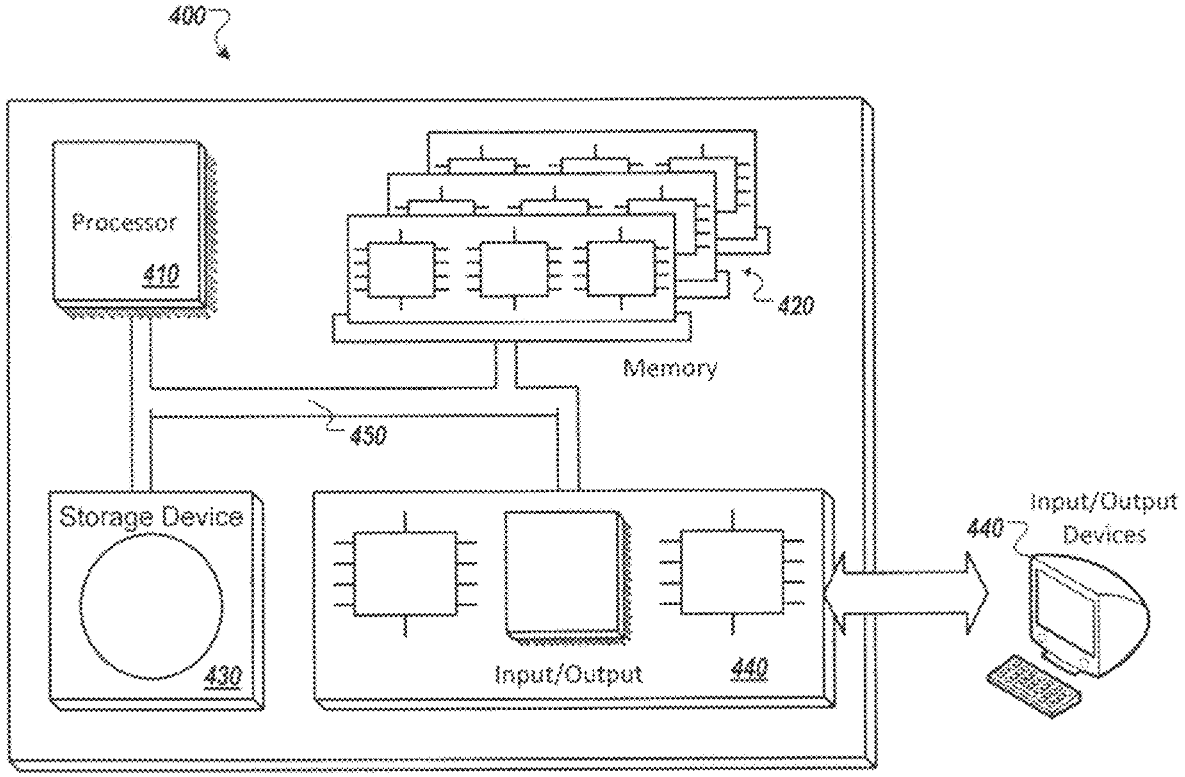
FIG. 10 shows a block diagram of an example computing device which can be used to implement the systems and methods described herein.

FIG. 10 shows a block diagram of an example computing device 400 which can be used to implement the systems and methods described in this document, as either a client or as a server or plurality of servers. For example, at least some of the elements in the computing device 400 can be used to implement the fan controller to control the fan and can also be used to implement the control algorithm to schedule loading, unloading, and freezing cycles of the plurality of blast cells in a blast cell array, and to control the cranes or other autonomous storage and retrieval machines to carry out the loading and unloading of the blast cells.

Computing device 400 includes a processor 410, memory 420, a storage device 430, and an input/output device 440. Each of the components 410, 420, 430, and 440 are interconnected using a system bus 450. The processor 410 can process instructions for execution within the computing device 400, including instructions stored in the memory 420 or on the storage device 430. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the computing device 400. In one implementation, the memory 420 is a computer-readable medium. In one implementation, the memory 420 is at least one volatile memory unit. In another implementation, the memory 420 is at least one non-volatile memory unit.

The storage device 430 is capable of providing mass storage for the computing device 400. In one implementation, the storage device 430 is a computer-readable medium. In various different implementations, the storage device 430 can be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 420, the storage device 430, or memory on processor 410.

The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

We claim:

1. An apparatus for cooling items, the apparatus comprising:

a housing defining (i) a bay space, (ii) a plenum positioned above the bay space, (iii) a front air passage fluidly connecting a front end of the bay space to a front end of the plenum, and (iv) a rear air passage fluidly connecting a rear end of the bay space to a rear end of the plenum, wherein the bay space, the plenum, the front air passage, and the rear air passage collectively provide a closed-loop within which air is circulated within the housing, wherein the bay space includes a plurality of layers that are each configured to hold one or more rows of pallets of items to be cooled;

a fan positioned within the plenum and configured to circulate air through the closed-loop provided by the bay space in the housing, the fan operable to (i) pull the air from the rear end of the bay space, through the rear air passage, and into the rear end of the plenum, and (ii) discharge the air into the front end of the plenum, through the front air passage, and toward the front end of the bay space;

a first plurality of channels arranged within the rear air passage, each of the first plurality of channels defining a first fluid pathway that (i) is fluidly separate from other fluid pathways provided by others of the first plurality of channels and (ii) extends from a rear end of a corresponding layer of the plurality of layers to the rear end of the plenum, the first plurality of channels configured to, over their length, turn a direction of airflow from the rear end of the bay space to the rear end of the plenum; and a second plurality of channels arranged within the front air passage, each of the second plurality of channels defining a second fluid pathway, each of the second plurality of channels defining a second fluid pathway that (i) is fluidly separate from other second fluid pathways provided by others of the second plurality of channels and (ii) extends from a front end of a corresponding layer of the plurality of layers to the front end of the plenum, the second plurality of channels configured to, over their length, turn a direction of airflow from the front end of the plenum to the front end of the bay space, wherein the first and second plurality of channels have corresponding vertical alignment such that respective terminal points of the first and second plurality of channels on opposing sides of the bay space intersect same horizontal planes.

2. The apparatus for cooling items of claim 1, wherein at least one first fluid passageway formed by the first plurality of channels is continuous with at least one second fluid passageway formed by the second plurality of channels, the first fluid passageway coupled to the second fluid passageway by at least one corresponding layer of the plurality of layers.

3. The apparatus for cooling items of claim 1, wherein the fan is configured to draw an equal volume of air through each of the first plurality of channels.

4. The apparatus for cooling items of claim 1, further comprising:

at least two doors formed in the housing, the at least two doors providing access to the one or more rows of pallets of items to be cooled of each layer of the plurality of layers.

5. The apparatus for cooling items of claim 4, wherein the at least two doors comprises a first door formed in a first side of the housing and a second door formed in a second side of the housing opposite the first side.

6. The apparatus for cooling items of claim 5, wherein the first door and the second door are formed so as to provide access to the bay space in a direction perpendicular to an airflow from the front air passage to the rear air passage through each layer of the plurality of layers.

7. The apparatus for cooling items of claim 6, wherein the first door and the second door are configured to selectively open or close an entrance of the housing through which the items to be cooled are moved into and out of the bay space.

8. The apparatus for cooling items of claim 7, wherein the first door and the second door are positioned on the housing so as to provide access to a storage and retrieval system to the items to be cooled within the bay space.

9. The apparatus for cooling items of claim 1, wherein the first plurality of channels has a width that gradually becomes smaller from a drawing end adjacent the rearward region of the bay space to an opposite discharging end adjacent the at least one fan.

10. The apparatus for cooling items of claim 9, wherein the second plurality of channels has a width that gradually becomes larger from a drawing end adjacent the front end of the plenum to an opposite discharging end adjacent the forward region of the bay space.

11. The apparatus for cooling items of claim 10, wherein the first plurality of channels and second plurality of channels includes one or more walls curved between the drawing end and the discharging end.

12. The apparatus for cooling items of claim 11, further comprising an air flow guide arranged at a corner of the housing and configured to streamline air flow at the corner with reduced turbulence.

13. The apparatus for cooling items of claim 12, wherein the air flow guide includes a plurality of turning vanes configured to provide curved air passages at the corner.

14. The apparatus for cooling items of claim 1, wherein the fan is configured to selectively operate in a plurality of modes including a first operational mode and a second operational mode, wherein the at least one fan is configured to create air flow in a first direction in the first operational mode and in a second direction in the second operational mode.

15. The apparatus for cooling items of claim 1, wherein the fan is a first fan, and further comprising a second fan positioned at an end of the plenum opposite the first fan.

16. The apparatus for cooling items of claim 1, the apparatus is configured as a blast freezer.

17. The apparatus for cooling items of claim 1, wherein the plurality of layers of each cell comprises four (4) layers.

18. The apparatus for cooling items of claim 17, wherein each of the four layers includes 16 pallet stacking positions, arranged in four rows of four pallet stacking positions.

19. The apparatus for cooling items of claim 1, wherein the opposing sides of the bay space comprise the plenum.

20. The apparatus for cooling items of claim 1, wherein the opposing sides of the bay space comprise opposing ends of the plurality of layers.

21. A system for cooling items, the system comprising:

a plurality of cells arranged side-by-side, each cell comprising:

a housing defining (i) a bay space, (ii) a plenum positioned above the bay space, (iii) a front air passage fluidly connecting a front end of the bay space to a front end of the plenum, and (iv) a rear air passage fluidly connecting a rear end of the bay space to a rear end of the plenum, wherein the bay space, the plenum, the front air passage, and the rear air passage collectively provide a closed-loop within which air is circulated within the housing, wherein the bay space includes a plurality of layers that are each configured to hold one or more rows of pallets of items to be cooled;

a fan positioned within the plenum and configured to circulate air through the closed-loop provided by the bay space in the housing, the fan operable to (i) pull the air from the rear end of the bay space, through the rear air passage, and into the rear end of the plenum, and (ii) discharge the air into the front end of the plenum, through the front air passage, and toward the front end of the bay space; and a first plurality of channels arranged within the rear air passage, each of the first plurality of channels defining a first fluid pathway that (i) is fluidly separate from other fluid pathways provided by others of the first plurality of channels and (ii) extends from a rear end of a corresponding layer of the plurality of layers to the rear end of the plenum, the first plurality of channels configured to, over their length, turn a direction of airflow from the rear end of the bay space to the rear end of the plenum, and a crane rail that extends between each of the plurality of cells for loading and unloading the plurality of cells using a crane.

22. The system of claim 21, further comprising:

an evaporator configured to cool the air upstream the fan.

23. The system of claim 22, wherein the plurality of cells is arranged in an array having m rows and n columns.

24. The system of claim 23, further comprising:

a plurality of crane rails each extending between adjacent rows of the m rows; and a first end rail and second end rail extending along an outer side of each end row of the m rows.

25. The system of claim 24, further comprising a plurality of cranes, each crane of the plurality of cranes configured to move along one crane rail of the plurality of crane rails, or the first end rail or second end rail.

26. The system of claim 25, wherein the crane is configured to (i) move laterally adjacent to a row along one crane rail of the plurality of crane rails, or along one of the first end rail or second end rail, and (ii) move vertically so as to access each of the plurality of layers of each cell.

27. The system of claim 26, wherein the crane comprises:

a crane guide coupling the crane to a crane rail, first end rail, or second end rail; and a telescoping component, the telescoping component operable to extend from the crane perpendicularly to the crane rail so as to load or unload one or more pallets of items to be cooled from the bay space.

28. The system of claim 27, wherein the telescoping component is configured to engage one of a plurality of racks, each rack positioned adjacent a pallet position within the bay space.

29. The system of claim 28, wherein the telescoping component is configured to load or unload one or more pallets of items to be cooled from the bay space from a rack positioned adjacent a pallet position within the bay space.

30. The system of claim 29, further comprising at least two doors formed in the housing, the at least two doors providing access to the one or more rows of pallets of items to be cooled of each layer of the plurality of layers.

31. The system of claim 30, wherein the at least two doors comprises a first door formed in a first side of the housing and a second door formed in a second side of the housing opposite the first side.

32. The system of claim 31, wherein the first door and the second door are configured to selectively open or close an entrance of the housing through which the items to be cooled are moved into and out of the bay space.

33. The system of claim 32, further comprising at least one processor, the processor configured to determine a schedule for loading and unloading each of the plurality of cells, and to generate instructions for transmission to at least one of the crane, first door, and second door to accomplish the loading and unloading.

34. The system of claim 33, wherein the at least one processor is configured to determine the schedule for loading and unloading each of the plurality of cells based on a calculation of an estimated freezing cycle end time of each of the plurality of cells.

35. The system of claim 32, further comprising:

a second plurality of channels arranged within the front air passage, each of the second plurality of channels defining a second fluid pathway extending from a front end of a corresponding layer of the plurality of layers to the front end of the plenum, the second plurality of channels configured to, over their length, turn a direction of airflow from the front end of the plenum to the front end of the bay space.

36. The system of claim 35, wherein at least one first fluid passageway formed by the first plurality of channels is continuous with at least one second fluid passageway formed by the second plurality of channels, the first fluid passageway coupled to the second fluid passageway by at least one corresponding layer of the plurality of layers.

37. The system of claim 32, wherein the m rows comprise four (4) rows and the n columns comprise six (6) columns.

38. The system of claim 35, wherein the plurality of layers of each cell comprises four (4) layers.

39. The system of claim 36, wherein each of the four layers includes 16 pallet stacking positions, arranged in four rows of four pallet stacking positions.

40. A method for scheduling loading and unloading a cooling system, the method comprising:

providing an array of blast cells in a blast freezing system, the array of blast cells comprising m rows of blast cells with an outer row at each end, the blast freezing system including a plurality of rails with a rail positioned between each row of blast cells and at an outside edge of the outer rows, and a plurality of automated cranes, each crane of the plurality of automated cranes configured to move along a dedicated rail of the plurality of rails to access blast cells along the rail through at least one door of the blast cells opening to the rail;

determining a start time of a freezing cycle for each of the blast cells in the array;

determining an estimated end time of the freezing cycle for each of the blast cells in the array based on the determined start time;

scheduling at least one automated crane to unload each of the blast cells based on the estimated end time of the freezing cycle;

generating first instructions for transmission to at least one automated crane, the first instructions comprising at least one of a location of a blast cell along the dedicated rail associated with the at least one automated crane and a time; and transmitting the first instructions to the at least one automated crane.

41. The method of claim 40, further comprising selecting a first automated crane to unload a first blast cell from a first door of the blast cell, and selecting a second automated crane to unload the first blast cell from the second door of the blast cell.

42. The method of claim 41, further comprising assigning each pallet of the first blast cell to be unloaded by one of the first automated crane and second automated crane, and transmitting instructions including the assignment of pallets and a position of each assigned pallet to the first automated crane and the second automated crane.

43. The method of claim 40, further comprising providing second instructions to at least one door of the blast cell to open when the at least one automated crane are at the location.

44. The method of claim 40, further comprising determining, based on the estimated end time of the freezing cycle for each of the blast cells in the array, an order for unloading each of the blast cells in the array.

45. The method of claim 44, further comprising determining a schedule of loading and unloading the plurality of blast cells to optimize a utilization of the plurality of automated cranes.

* * * * *